(12) United States Patent
Alshafei et al.

(10) Patent No.: US 12,533,667 B2
(45) Date of Patent: Jan. 27, 2026

(54) MOLECULAR SIEVE CIT-17, ITS SYNTHESIS AND USE

(71) Applicant: California Institute of Technology, Pasadena, CA (US)

(72) Inventors: Faisal H Alshafei, Monrovia, CA (US); Mark E Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 155 days.

(21) Appl. No.: 18/508,778

(22) Filed: Nov. 14, 2023

(65) Prior Publication Data

US 2024/0173708 A1    May 30, 2024

Related U.S. Application Data

(60) Provisional application No. 63/425,250, filed on Nov. 14, 2022.

(51) Int. Cl.
*B01J 29/85*      (2006.01)
*B01J 35/63*      (2024.01)
(Continued)

(52) U.S. Cl.
CPC ............ *B01J 29/85* (2013.01); *B01J 35/633* (2024.01); *B01J 37/0018* (2013.01); *B01J 37/04* (2013.01); *B01J 37/06* (2013.01); *B01J 37/08* (2013.01); *C01B 37/08* (2013.01); *C07C 1/22* (2013.01); *C01P 2002/72* (2013.01); *C01P 2002/86* (2013.01); *C01P 2002/88* (2013.01); *C01P 2004/03* (2013.01); *C01P 2006/14* (2013.01); *C07C 2529/85* (2013.01)

(58) Field of Classification Search
CPC ...... B01J 29/85; B01J 35/633; B01J 37/0018; B01J 37/04; B01J 37/06; B01J 37/08; C01B 37/08; C07C 1/22; C07C 2529/85; C07C 1/20; C01P 2002/72; C01P 2002/86; C01P 2002/88; C01P 2004/03; C01P 2006/14
USPC .......................................................... 585/640
See application file for complete search history.

(56) References Cited

U.S. PATENT DOCUMENTS 2,942,932 A    6/1960   Elliott
3,699,683 A    10/1972   Tourtellotte et al.
(Continued)

FOREIGN PATENT DOCUMENTS

CN      101176851 A    5/2008
CN      101412522 A    4/2009
(Continued)

OTHER PUBLICATIONS

Castro et al., "Molecular Modeling, Multinuclear NMR and Diffraction Studies in the Templated Synthesis and Characterization of the Aluminophosphate Molecular Sieve STA-2" J. Phys. Chem. C., 2010, 114(29), 12698-12710.
(Continued)

*Primary Examiner* — Prem C Singh
*Assistant Examiner* — Francis C Campanell
(74) *Attorney, Agent, or Firm* — BakerHostetler

(57) ABSTRACT

The present disclosure is directed to novel silicoaluminophosphate (SAPO)-based material with an SAT framework structure (topology type) (SAPO-SAT) that is substantially free of a non-SAPO-SAT phase, as well as the synthesis and use of that SAPO-SAT.

21 Claims, 18 Drawing Sheets

(51) Int. Cl.
  *B01J 37/00* (2006.01)
  *B01J 37/04* (2006.01)
  *B01J 37/06* (2006.01)
  *B01J 37/08* (2006.01)
  *C01B 37/08* (2006.01)
  *C07C 1/22* (2006.01)

(56) References Cited

U.S. PATENT DOCUMENTS

| | | |
|---|---|---|
| 4,297,328 A | 10/1981 | Ritscher et al. |
| 4,737,592 A | 4/1988 | Abrams et al. |
| 5,078,979 A | 1/1992 | Dunne |
| 6,508,860 B1 | 1/2003 | Kulkarni et al. |
| 9,700,878 B2 | 7/2017 | Xie et al. |
| 2006/0245994 A1 | 11/2006 | Watanabe et al. |
| 2007/0287871 A1* | 12/2007 | Brevoord ............... B01J 35/77 585/365 |
| 2017/0312743 A1 | 11/2017 | Casci et al. |
| 2018/0117572 A1 | 5/2018 | Hotta et al. |
| 2020/0330966 A1* | 10/2020 | Petrovic ............... B01J 35/56 |

FOREIGN PATENT DOCUMENTS

| | | |
|---|---|---|
| EP | 1652817 A1 | 5/2006 |
| JP | 2017-014077 A | 1/2017 |

OTHER PUBLICATIONS

Noble et al., "The Templated Synthesis and Structure Determination by Synchrotron Diffraction of the Novel Small Pore Magnesium Aluminophosphate STA-2", J. Chem. Soc. Dalton Trans., 1997, No. 23, 4485-4490.

Seymour et al., "An NMR Cystallographic Approach to Monitoring Cation Substitution in the Aluminophosphate STA-2", Solid State Nuclear Magnetic Resonance, 2015, 65, 36 pages.

Yang et al., "High Propylene Selectivity in Methanol Conversion over a Small-Pore SAPO Molecular Sieve with Ultra-Small Cage", ACS Catal., 2020, 10(6), 3741-3749.

* cited by examiner

B.

A.

MOLECULAR SIEVE CIT-17, ITS SYNTHESIS AND USE

CROSS REFERENCE TO RELATED APPLICATIONS

This application claims the benefit of U.S. Provisional Application No. 63/425,250, filed Nov. 14, 2022, the entirety of which is incorporated by reference herein.

TECHNICAL FIELD

The disclosure is directed to a silicoaluminophosphate (SAPO)-based material with an SAT framework structure (topology type) (SAPO-SAT) that is substantially free of a non-SAPO-SAT phase, as well as the synthesis and use of that SAPO-SAT.

BACKGROUND

Ethylene (E) and propylene (P) are two of the most important building blocks in the petrochemical industry as they are key in the synthesis of a wide spectrum of polymers and fine chemicals. However, a global propylene shortage is predicted as demand is expected to outstrip supply in upcoming years due to the rapidly growing demand for propylene alongside the low propylene yield that is achieved in naphtha cracking processes. These market dynamics have paved the road for on-purpose production technologies such as, methanol-to-olefins (MTO) processes, to mitigate this shortfall in supply.

Molecular sieves containing Brønsted acid sites are at the nexus of the MTO process, with SAPO-34 (CHA) being the catalyst deployed industrially. In MTO, framework structure and composition (acidity) together with reaction conditions determine the reaction intermediates that form as a part of the dual-cycle mechanism, which ultimately dictate product selectivity. In prior reports, enhancing propylene selectivity was primarily achieved by utilizing (i) 10- or 12-member ring (MB) zeolites (e.g., MFI and *BEA) with high Si/Al (i.e., low acid sites) in order to suppress the aromatics cycle and improve the alkene cycle, or (ii) 8-MR molecular sieves with cages larger than CHA (e.g., AEI and DDR), in order to accommodate higher substituted methylbenzenes.

The framework structure of CIT-17 belongs to a family of molecular sieve solids that are built up by stacking six-membered rings (6MRs) at different positions in the xy plane of a hexagonal unit cell and then connected via 4MRs. The stacking sequence of the 6MRs for SAT is ABBCBC-CACAAB. A single column of this structure consists of double six-membered rings (D6Rs), CAN cages, and elongated cages (SAT-cages) that are interconnected via elliptical 8MRs. The first SAT-type material synthesized was a magnesium aluminophosphate (MgAPO) that was denoted as STA-2.[1] See W. Noble, et al. The Templated Synthesis and Structure Determination by Synchrotron Microcrystal Diffraction of the Novel Small Pore Magnesium Aluminophosphate STA-2†. J. Chem. Soc., Dalton Trans. 1997, No. 23, 4485-4490. https://doi.org/10.1039/A705091G. The organic structure directing agent (OSDA) that resulted in the formation of STA-2 was 1,4-bis-N-quinuclidinium-butane (abbreviated as DiQ-C$_4$), although it was later shown that substituting diazabicyclooctane (DABCO) for quinuclidine in the OSDA and increasing the linker length from four methylene groups to five also resulted in the formation of STA-2. A key challenge with the synthesis of STA-2-type materials is that they often co-crystallize with other phases—primarily, AFX-type molecular sieves. Of the various compositions attempted for the synthesis of STA-2, SAPO-SAT has been the most challenging to synthesize in a pure form, as it co-crystallizes with SAPO-56 (AFX).

CIT-17 due to its cage architecture, pore size and mild acidity is a promising candidate as a catalyst in hydrocarbon catalytic reactions (e.g., methanol-to-olefins) and/or separation processes involving small molecules.

STA-2 (an SAT-type molecular sieve) was first reported in 1997 as MgAPO (magnesium aluminophosphate) following a hydrothermal synthesis approach in the presence of $[(C_7H_{13}N)(CH_2)_4(NC_7H_{13})]^{2+}$ (abbreviated as DiQ-C$_4$) as an organic-structure directing agent (OSDA). See W. Noble, et al. The Templated Synthesis and Structure Determination by Synchrotron Microcrystal Diffraction of the Novel Small Pore Magnesium Aluminophosphate STA-2†. J. Chem. Soc., Dalton Trans. 1997, No. 23, 4485-4490. https://doi.org/10.1039/A705091G. The authors that first reported the synthesis of STA-2 attempted to synthesize this material both in the absence and presence of sodium ions. In experiments where sodium was used, the organic-structure directing agent used was in the bromide form and sodium hydroxide was used as a sodium source (to adjust the pH of the gel). When the hydroxide form of the OSDA was used, no sodium was added as all the [OH$^-$] came from the OSDA.

The first successful STA-2 phase was prepared from a gel of composition of 0.4 R(OH)$_2$:0.1 Mg(O$_2$CMe)$_2$ (magnesium acetate tetrahydrate):0.9 Al(OH)$_3$:H$_3$PO$_4$:40 H$_2$O, where R represents the diquinudlidinium ion and the interconnected chain of the OSDA containing four or five methylene groups. The synthesis was performed in a static oven heated to 190° C. for 48 h. The above gel reportedly led to the synthesis of STA-2 (MgAPO). The product consisted of sub-micron particles with poorly defined crystal shapes and contained some amorphous material. A pore volume of 0.095 cm$^3$/g was calculated for this MgAPO material (STA-2). Attempts to increase the Mg/P from 0.1 to 0.15 in the aforementioned gel led to the co-crystallization of STA-2 and MgAPO-56 (AFX). In another experiment, adding the OSDA in its bromide form along with sodium hydroxide reportedly led to the co-crystallization of STA-2 and MgAPO-56. The co-crystallized STA-2 from the sodium-containing gel had rhomb-shaped particles with dimensions of up to 50 microns.

In 2010, molecular modeling for the synthesis of STA-2 was reported. See Castro, M.; et al. Molecular Modeling, Multinuclear NMR, and Diffraction Studies in the Templated Synthesis and Characterization of the Aluminophosphate Molecular Sieve STA-2. J. Phys. Chem. C 2010, 114 (29), 12698-12710. https://doi.org/10.1021/jp104120y. The goal was to use molecular modeling to assist in the design of a new structure directing agent for the synthesis of the AlPO form of STA-2. Instead of using DiQ-C$_4$, a rather expensive molecule, as was done in their previous work, the authors proposed using bis-diazabicyclooctane-butane (abbreviated as DiDABCO-C$_4$). This is a fairly similar molecule in terms of its size and structure to the quinuclidine-based molecule, but is considerably less expensive. The synthesis of AlPO, MgAPO and SAPO-based materials at identical gels using three different OSDAs: DiDABCO-C$_4$, and DiDABCO-C$_5$ was attempted. All reactions were performed at 190° C. for 48-168 h. A summary table of the reported results is shown below.

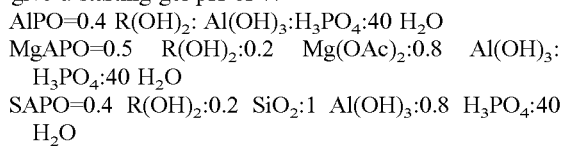

| OSDA | Inorganic Composition | Product Phase |
| --- | --- | --- |
| DiQ-C$_4$ | AlPO | STA-2 |
|  | MgAPO | MgAPO-56 |
|  | SAPO | STA-2, SAPO-56 |
| DiDABCO-C$_4$ | AlPO | STA-2 |
|  | MgAPO | STA-2, MgAPO-56 |
|  | SAPO | STA-2, SAPO-56 |
| DiDABCO-C$_5$ | AlPO | Unidentified phase |
|  | MgAPO | STA-2, MgAPO-5 |

Typical gel compositions employed are shown below. In each case, alkylammonium hydroxide was reportedly added to give a starting gel pH of 7.

AlPO=0.4 R(OH)$_2$: Al(OH)$_3$:H$_3$PO$_4$:40 H$_2$O

MgAPO=0.5 R(OH)$_2$:0.2 Mg(OAc)$_2$:0.8 Al(OH)$_3$: H$_3$PO$_4$:40 H$_2$O

SAPO=0.4 R(OH)$_2$:0.2 SiO$_2$:1 Al(OH)$_3$:0.8 H$_3$PO$_4$:40 H$_2$O

Clearly, SAPO-SAT cannot be formed as a pure product using the disclosed gel compositions.

Another publication discloses the synthesis of Mg and Zn containing aluminophosphate materials. See Seymour, V. R.; et al. An NMR Crystallographic Approach to Monitoring Cation Substitution in the Aluminophosphate STA-2. *Solid State Nuclear Magnetic Resonance* 2015, 65, 64-74. https://doi.org/10.1016/j.ssnmr.2014.10.007. The gel employed for the synthesis of MeAPO is reportedly: (Me=Mg, or Zn)=0.45 R(OH)$_2$:x Mg(OAc)$_2$:1-x Al(OH)$_3$:H$_3$PO$_4$:39 H$_2$O. Magnesium acetate and zinc acetate were used as metal sources. The crystallization was carried out in Teflon-lined static autoclaves at 190° C. for 6 to 7 days. No attempts for the synthesis of SAPO-SAT were made. Pure and impure STA-2 type products containing Mg and Zn were reportedly obtained, depending the metal content.

The synthesis of a small-pore SAPO (SAPO-14) material with an AFN topology has also been reported. See Yang, M.; et al. High Propylene Selectivity in Methanol Conversion over a Small-Pore SAPO Molecular Sieve with Ultra-Small Cage. *ACS Catal.* 2020, 10 (6), 3741-3749. https://doi.org/10.1021/acscatal.9b04703. This material achieves a record high one-pass propylene selectivity (65.7%) and a propylene-to-ethylene ratio of 4.1 when tested at 450° C. and WHSV of 0.5 h$^{-1}$, although it has an extremely short lifetime. At temperatures lower than 450° C., the catalyst cannot maintain 100% conversion.

As these prior reports demonstrate, CIT-17 is structurally related to a previously synthesized aluminophosphate-based solid, STA-2. Gels previously employed for the synthesis of STA-2-type materials (including SAPOs) led to the cocrystallization of SAT and other frameworks (e.g., AFX) or impurities that were detectable via X-ray diffraction. Once these impurity phases form, the SAT phase cannot be separated from these undesired phases. a need exists for methods of making pure silicoaluminophosphate (SAPO)-based material with an SAT framework structure.

SUMMARY

The disclosure provides a silicoaluminophosphate-based molecular sieve having an SAT framework structure (SAPO-SAT), wherein the SAPO-SAT is substantially free of a non-SAPO-SAT phase. Processes for making the disclosed SAPO-SAT are also provided, as are processes for the production of propylene from a methanol-containing feed that utilize the SAPO-SAT as catalyst.

Thus, this disclosure provides a synthesis of a silicoaluminophosphate (SAPO)-based material with an SAT framework structure (topology type) (SAPO-SAT) referred to as CIT-17. CIT-17 was synthesized as a pure phase (or near pure) product as determined by X-ray diffraction (XRD) and scanning electron microscopy (SEM). The disclosure demonstrates that by modifying the gel composition previously employed to make STA-2, in order to identify a synthesis region were AFX doesn't readily form, a phase-pure SAT (as determined by XRD; denoted herein as CIT-17) can be obtained.

Following the successful synthesis of SAT-SAPO (CIT-17) as a pure phase, as determined via XRD, the material was tested in the methanol-to-olefins reaction for the first time. The CIT-17 catalyst, along with other SAT-type molecular sieves (e.g., MgAPO and CoAPO), gave an improved propylene-to-ethylene ratio (P/E=2-4.1) over SAPO-34 (CHA), the commercial catalyst (P/E=ca. 1), as well as SAPO-18 (AEI), a material known to yield high P/E (ca. 2). By tuning the reaction conditions, CIT-17 gave one of the highest P/E reported for this class of materials (i.e., small pore, cage-type molecular sieves) with an averaged P/E of 4.2 when methanol conversion was 97+%.

Thus, the present disclosure provides an alternative approach for enhancing P/E by utilizing a low acidity small-pore catalyst with a cage that is significantly narrower than CHA. The disclosure provides the synthesis and characterization of several SAT-type molecular sieves (e.g., MgAPO, CoAPO and SAPO), and their MTO behavior over a wide range of reaction conditions. The disclosure demonstrates that the combination of low acidity and unique structural features of the narrow SAT-cage lead to a catalytic pathway and a mechanism that predominantly favors propylene formation (P/E=2-4.2; P=40-50%).

DETAILED DESCRIPTION OF ILLUSTRATIVE EMBODIMENTS

Figure 1:
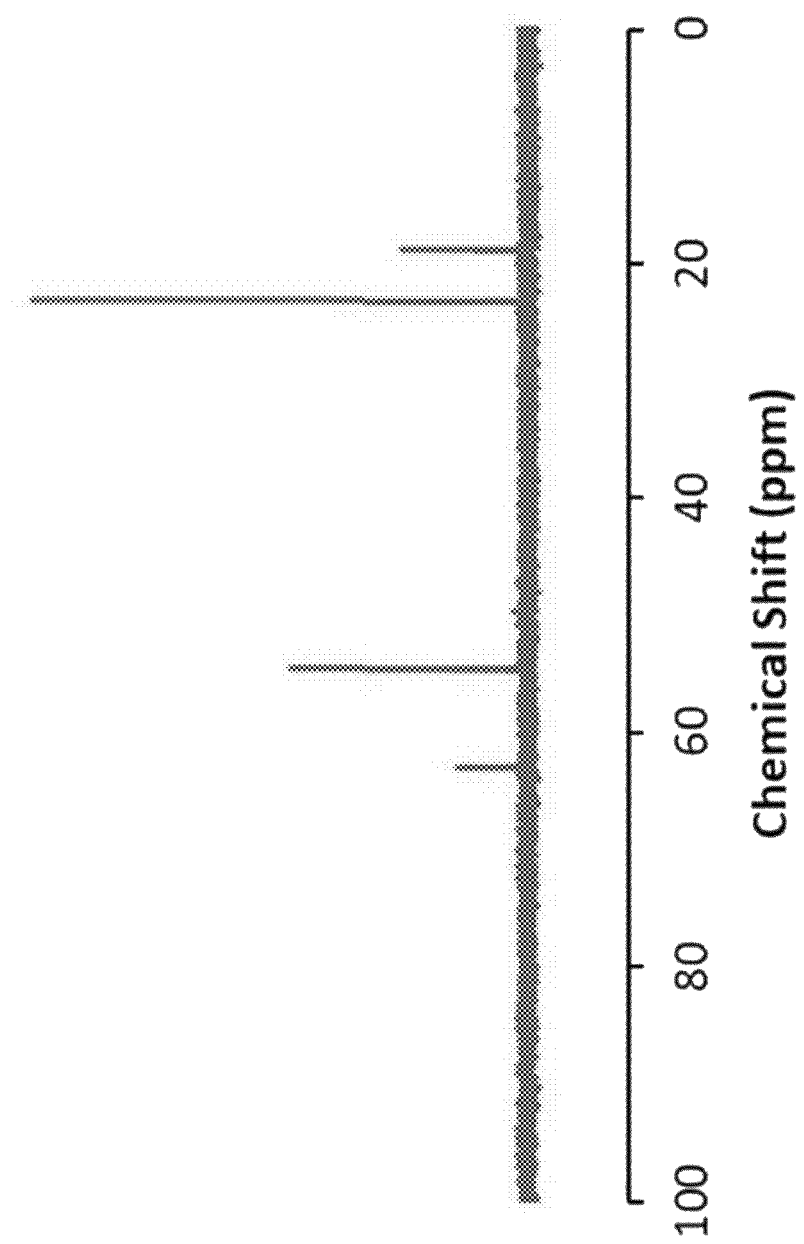
FIG. 1 shows the $^{13}$C-NMR of DiQ-C$_4$ dissolved in D$_2$O.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some embodiments, the term "about" as modifying a number indicates the recited number ±10% of the recited number. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of."

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments.

Throughout this specification, words are to be afforded their normal meaning, as would be understood by those skilled in the relevant art. However, so as to avoid misunderstanding, the meanings of certain terms will be specifically defined or clarified.

The terms "method(s)" and "process(es)" are considered interchangeable within this disclosure.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

A material disclosed herein may be referred to as being characterized by graphical data "as shown in" a Figure. Such data include, for example, powder X-ray diffractograms (XRD), thermogravimetric analysis (TGA) profiles, NMR spectra and the like. As is well-known in the art, the graphical data potentially provides additional technical information to further define the respective solid state form which can not necessarily be described by reference to numerical values or peak positions alone. Thus, the term "substantially as shown in" when referring to graphical data in a Figure herein means a pattern that is not necessarily identical to those depicted herein, but that falls within the limits of experimental error or deviations, when considered by one of ordinary skill in the art. The skilled person would readily be able to compare the graphical data in the Figures herein with graphical data generated for an unknown material and confirm whether the two sets of graphical data are characterizing the same material or two different materials.

Compositions

The present invention is directed to new compositions of matter, including those comprising CIT-17, and methods of making and using these compositions.

In some aspects, the disclosure is directed to a silicoaluminophosphate-based molecular sieve having an SAT framework structure (SAPO-SAT), wherein the SAPO-SAT is substantially free of a non-SAPO-SAT phase. The SAPO-SAT that is substantially free of a non-SAPO-SAT phase may be referred to herein as "CIT-17."

The framework structure of CIT-17 belongs to a family of molecular sieve solids that are built up by stacking six-membered rings (6MRs) at different positions in the xy plane of a hexagonal unit cell and then connected via 4MRs. The stacking sequence of the 6MRs for SAT is ABBCBC-CACAAB. A single column of this structure consists of double six-membered rings (D6 Rs), CAN cages, and elongated cages (SAT-cages) that are interconnected via elliptical 8MRs.

In these aspects, the term "substantially free of a non-SAPO-SAT phase" means that the CIT-17 does not include a detectable amount of a non-SAPO-SAT phase. Methods of detecting a non-SAPO-SAT phase in a sample of CIT-17 are known to those of skill in the art, and include, for example XRD.

Figure 4:
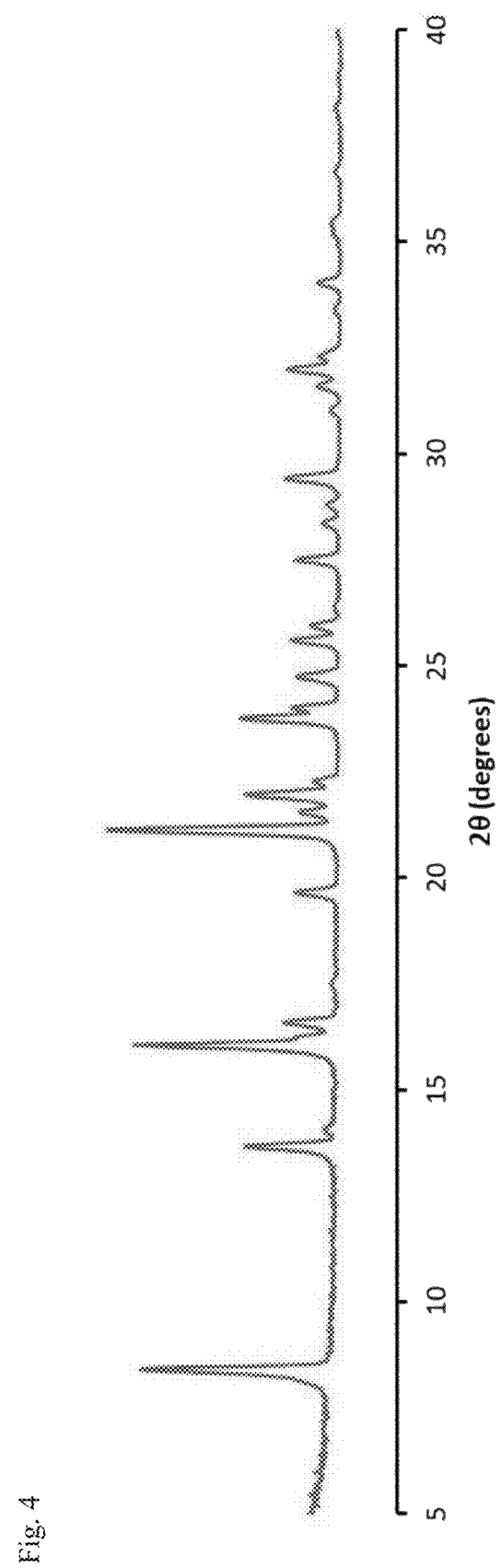
FIG. 4 shows the XRD pattern of the as-synthesized CIT-17 (Example 4).

In some embodiments, the CIT-17 of the disclosure has an x-ray powder diffraction pattern substantially the same as shown in FIG. 4. Note here that the relative intensities of the peaks shown in these or any other figures, may be subject to experimental variations, for example due to scanning speed, sample separation, particle size, degree if crystallinity (e.g., related to degree of heat processing). For example, pre-calcined materials isolated from the mixtures used to prepare them, may exhibit broader peaks than those same materials post-heat treatment or post-calcination. Such variability is reflected, in part, by any differences in the various XRD patterns described in the instant application. The person of skill in the art in this area would appreciate the significance of any such variations.

In other embodiments, the CIT-17 of the disclosure has an x-ray powder diffraction pattern exhibiting peaks at at least five of the peaks shown in FIG. 4, ±0.2 degrees 2-θ. In separate embodiments, the composition exhibits six, seven, eight, nine, or ten of the peaks shown in FIG. 4, ±0.2 degrees 2-θ.

Figure 13:
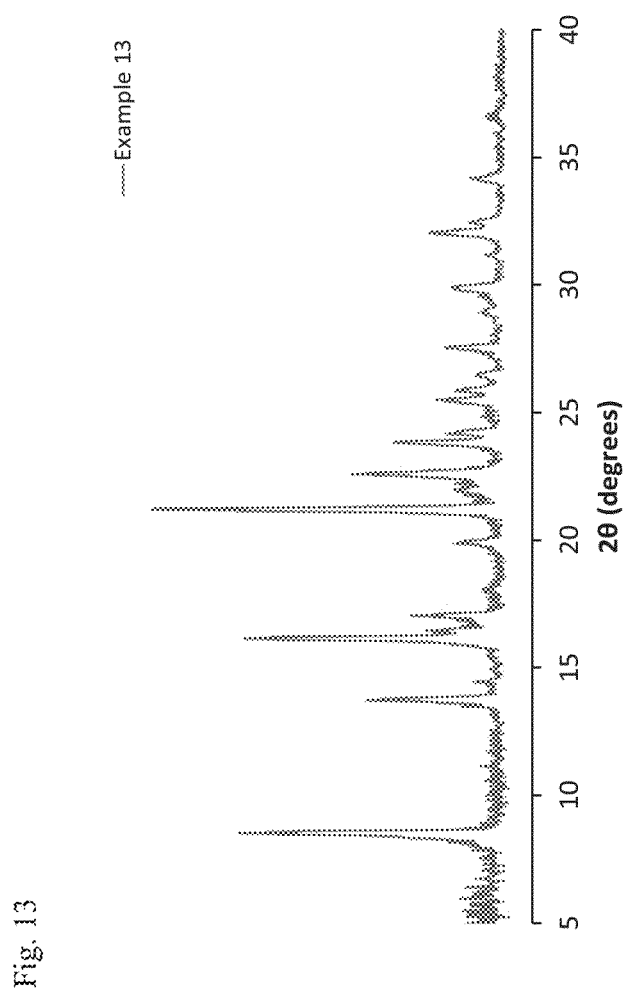
FIG. 13 shows the XRD pattern of the as-synthesized CIT-17 (Example 13).
Figure 14:
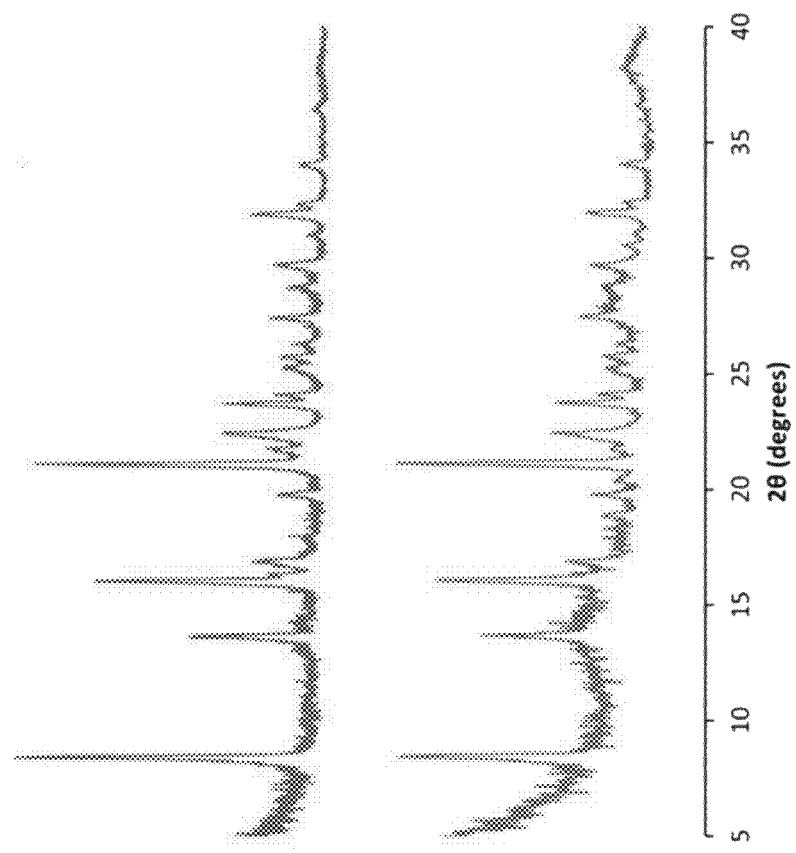
FIG. 14 shows the XRD patterns of the as-synthesized STA-2 (MgAPO). Example 29 (bottom) and Example 30 (top).
Figure 15:
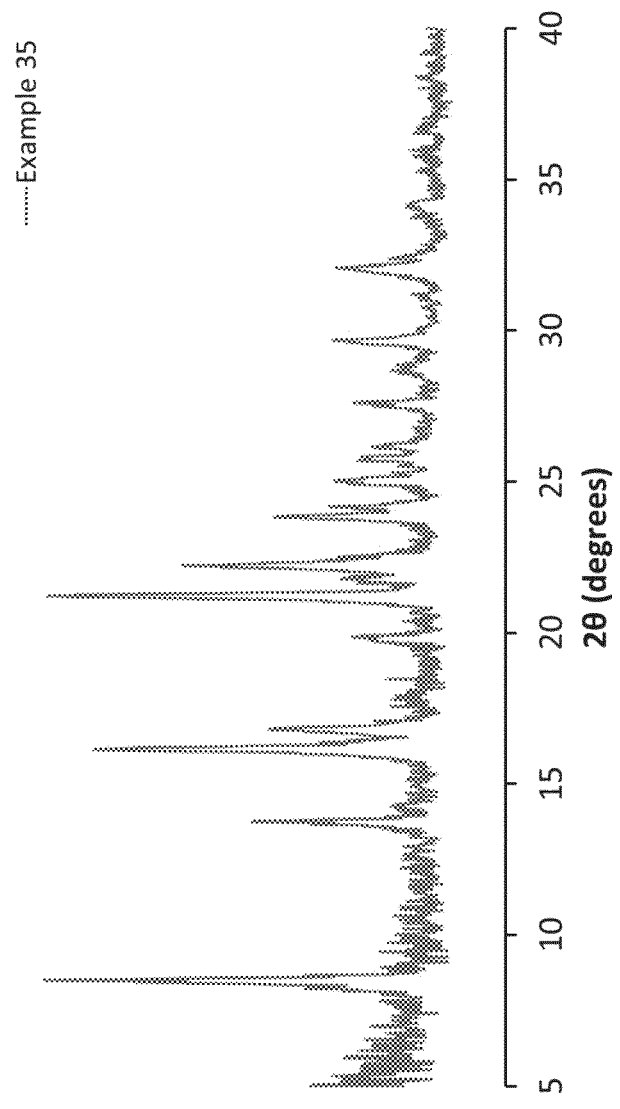
FIG. 15 shows the XRD pattern of the as-synthesized CoAPO-SAT (Example 35).

In other embodiments, the CIT-17 of the disclosure has an x-ray powder diffraction pattern substantially as shown in FIG. 13. In other embodiments, the CIT-17 of the disclosure has an x-ray powder diffraction pattern exhibiting peaks at at least five of the peaks shown in FIG. 13, ±0.2 degrees 2-θ. In separate embodiments, the composition exhibits six, seven, eight, nine, or ten of the peaks shown in FIG. 13, ±0.2 degrees 2-θ.

Figure 16:
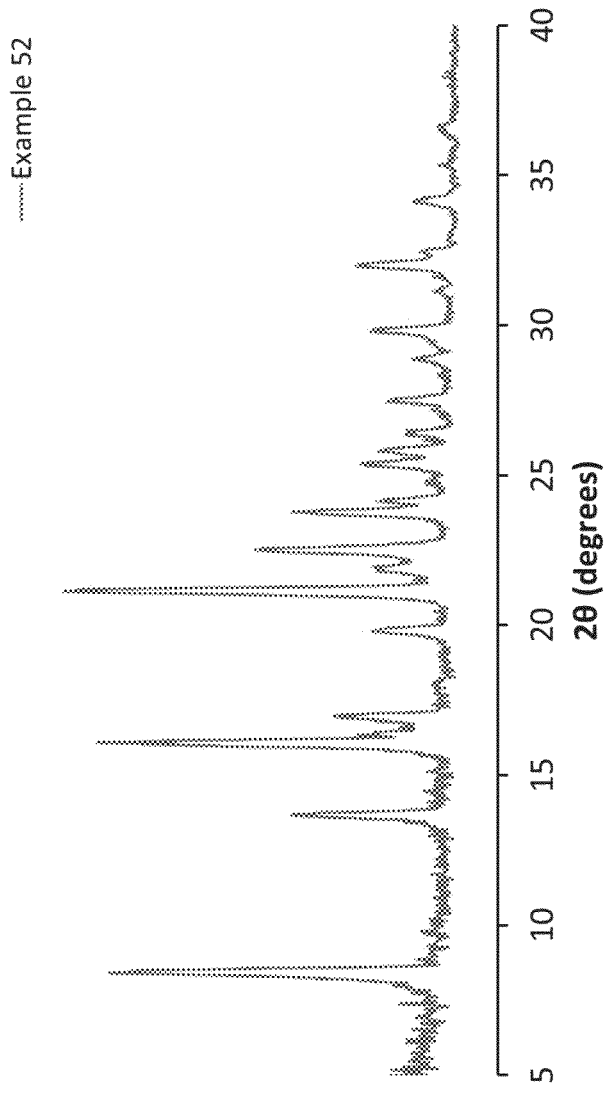
FIG. 16 shows the XRD pattern of the as-synthesized CIT-17 (Example 52).

In other embodiments, the CIT-17 of the disclosure has an x-ray powder diffraction pattern substantially as shown in FIG. 16. In other embodiments, the CIT-17 of the disclosure has an x-ray powder diffraction pattern exhibiting peaks at at least five of the peaks shown in FIG. 16, ±0.2 degrees 2-θ. In separate embodiments, the composition exhibits six, seven, eight, nine, or ten of the peaks shown in FIG. 16, ±0.2 degrees 2-θ.

In other embodiments, the CIT-17 of the disclosure exhibits a powder X-ray diffraction (XRD) pattern exhibiting at least five of the characteristic peaks at 8.4±0.2, 13.66±0.2, 16.06±0.2, 16.5±0.2, 19.62±0.2, 21.12±0.2, 21.94±0.2, 23.76±0.2, 25.6±0.2, 27.5±0.2, 29.46±0.2, and 32.02±0.2 degrees 2-θ. In separate embodiments, the composition exhibits six, seven, eight, nine, or ten of the characteristic peaks at 8.4±0.2, 13.66±0.2, 16.06±0.2, 16.58±0.2, 19.62±0.2, 21.12±0.2, 21.94±0.2, 23.76±0.2, 25.6±0.2, 27.5±0.2, 29.46±0.2, and 32.02±0.2 degrees 2-θ.

Figure 7:
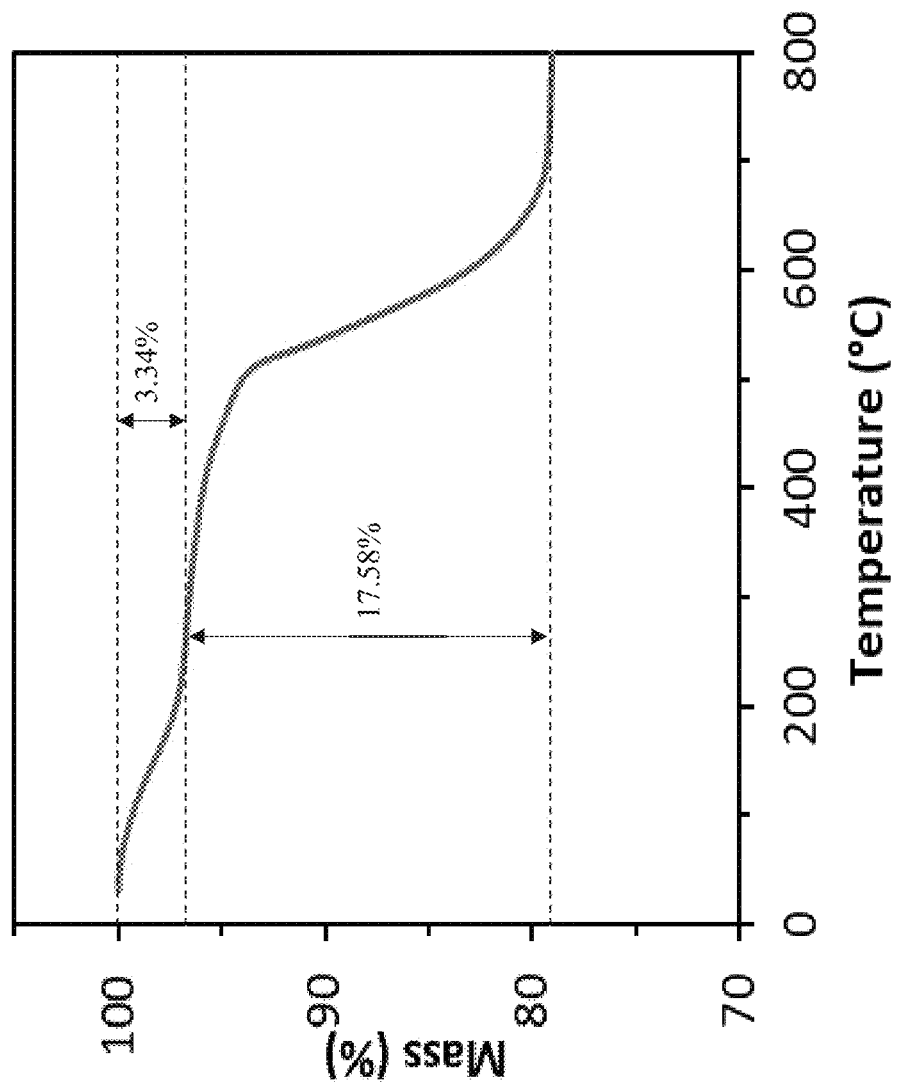
FIG. 7 shows the TGA profile of the as-synthesized of CIT-17.

In other embodiments, the SATO-SAT of the disclosure is characterized by a TGA profile substantially as shown in FIG. 7.

Figure 8:
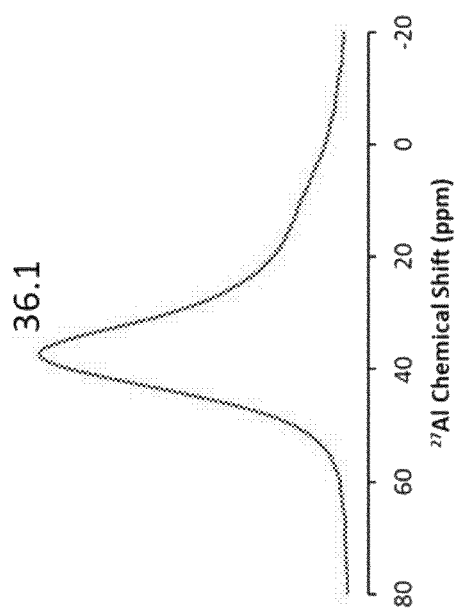
FIG. 8 shows the $^{27}$Al MAS NMR of thermally treated CIT-17 (Example 6).

In other embodiments, the thermally treated SATO-SAT of the disclosure is characterized by an $^{27}$Al MAS NMR substantially as shown in FIG. 8.

Figure 9:
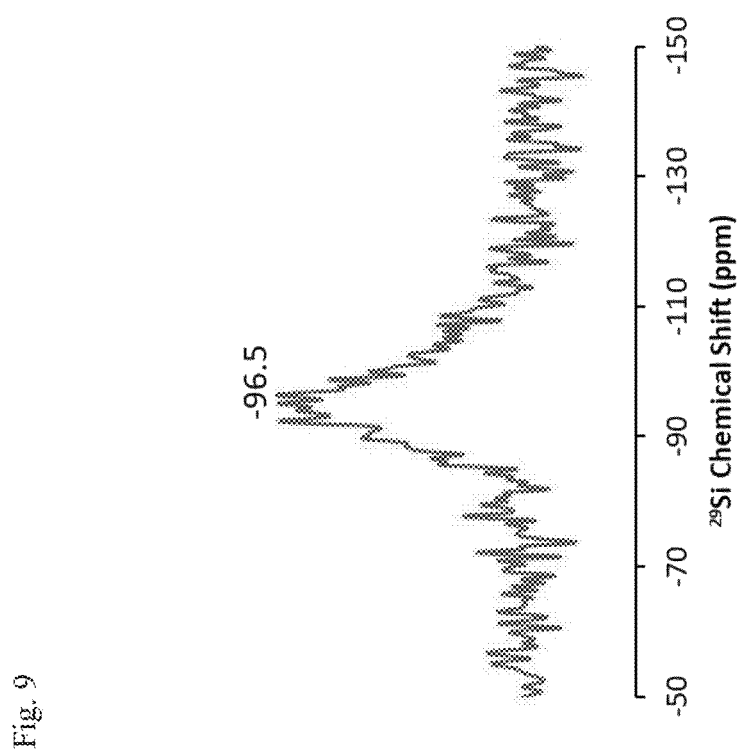
FIG. 9 shows the $^{29}$Si MAS NMR of thermally treated CIT-17 (Example 6).

In other embodiments, the thermally treated SATO-SAT of the disclosure is characterized by a $^{29}$Si MAS NMR substantially as shown in FIG. 9.

Figure 10:
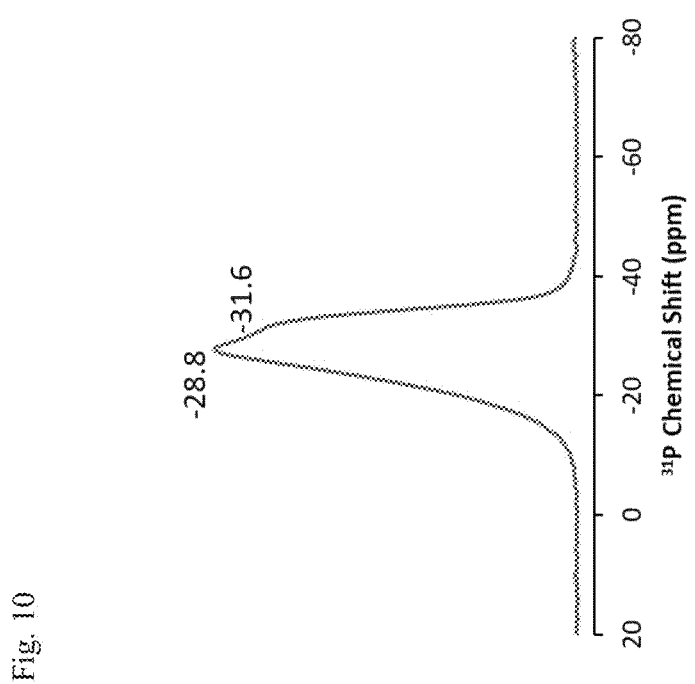
FIG. 10 shows the $^{31}$P MAS NMR of thermally treated CIT-17 (Example 6).

In other embodiments, the thermally treated SATO-SAT of the disclosure is characterized by a $^{31}$P MAS NMR substantially as shown in FIG. 10.

Figure 11:
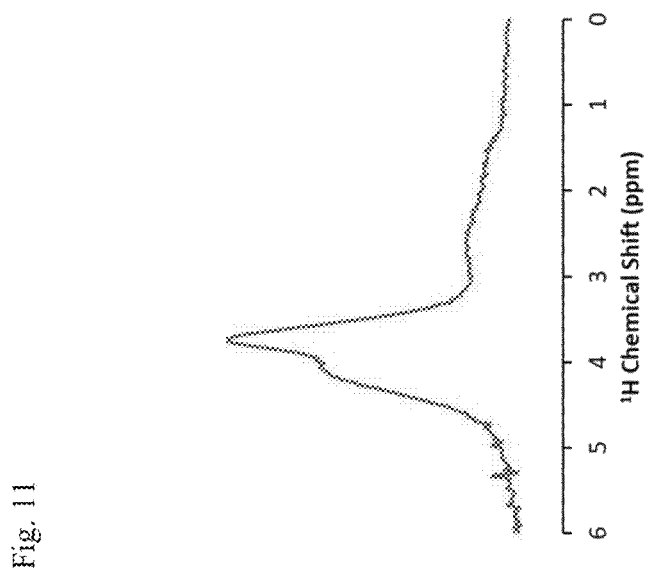
FIG. 11 shows the $^{1}$H MAS NMR of thermally treated CIT-17 (Example 6).

In other embodiments, the thermally treated SATO-SAT of the disclosure is characterized by a $^1$H MAS NMR substantially as shown in FIG. 11.

Figure 12:
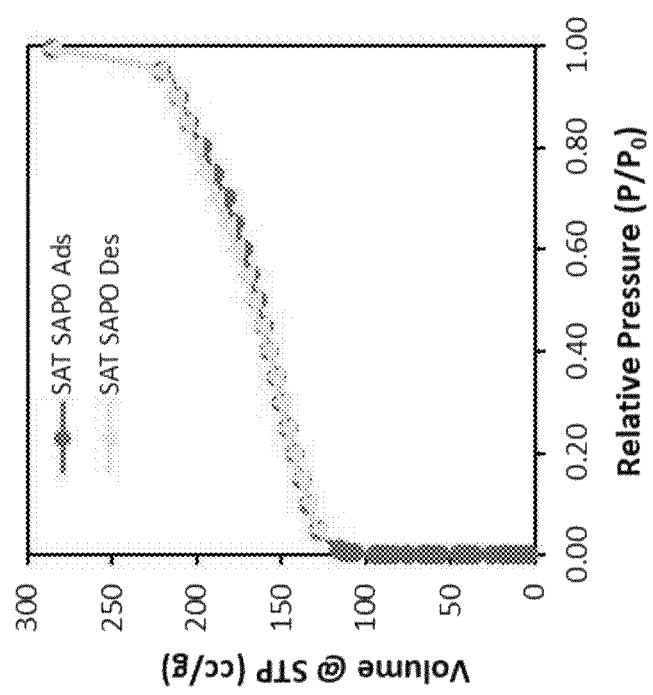
FIG. 12 shows the N$_2$-adsorption-desorption isotherms of thermally treated CIT-17 (Example 6). Circles (darker) correspond to adsorption and triangles (lighter) to desorption.

In other embodiments, the thermally treated SATO-SAT of the disclosure is characterized by N$_2$-adsorption-desorption isotherms substantially as shown in FIG. 12.

As noted, the CIT-17 of the disclosure is substantially free of a non-SAPO-SAT phase. In some embodiments, the CIT-17 is substantially free of SAPO-AFX.

Depending on the processing of the crystalline compositions, the CIT-17 compositions may contain the organic structure determining agent (OSDA) used in their preparation, or may be substantially free or devoid of any such OSDA. The specific OSDAs used to prepare CIT-17 are also described elsewhere herein.

The presence of these OSDAs may be identified using, for example, $^{13}$C NMR or any of the methods defined in the Examples. It is a particular feature of the present invention that the cationic OSDAs retain their original structures, including their stereochemical conformations during the synthetic processes, these structures being compromised during the subsequent calcinations or oxidative treatments.

In some embodiments, the CIT-17 is characterized by the Si/T-atom ratio wherein T=Si+Al+P. The Si/T-atom ratio may be determined by methods known in the art, including, for example, EDS elemental analysis. In some embodiments of the CIT-17 of the disclosure, the Si/T-atom ratio is from about 0.068 to about 0.094, such as for example, about 0.068, about 0.069, about 0.070, about 0.071, about 0.072, about 0.073, about 0.074, about 0.075, about 0.076, about 0.077, about 0.078, about 0.079, about 0.080, about 0.081, about 0.082, about 0.083, about 0.084, about 0.085, about 0.086, about 0.087, about 0.088, about 0.089, about 0.090, about 0.091, about 0.092, about 0.093, or about 0.094.

In other embodiments of the CIT-17 of the disclosure, the Si/T-atom ratio is from 0.068 to 0.094, such as for example, 0.068, 0.069, 0.070, 0.071, 0.072, 0.073, 0.074, 0.075, 0.076, 0.077, 0.078, 0.079, 0.080, 0.081, 0.082, 0.083, 0.084, 0.085, 0.086, 0.087, 0.088, 0.089, 0.090, 0.091, 0.092, 0.093, or 0.094. The Si/T-atom ratio may be determined by methods known in the art, including, for example, EDS elemental analysis. wherein T=Si+Al+P.

In other embodiments of the CIT-17 of the disclosure, the Si/T-atom ratio is from 0.068 to 0.094, such as for example, 0.068, 0.069, 0.070, 0.071, 0.072, 0.073, 0.074, 0.075, 0.076, 0.077, 0.078, 0.079, 0.080, 0.081, 0.082, 0.083, 0.084, 0.085, 0.086, 0.087, 0.088, 0.089, 0.090, 0.091, 0.092, 0.093, or 0.094. The Si/T-atom ratio may be determined by methods known in the art, including, for example, EDS elemental analysis. wherein T=Si+Al+P.

In other embodiments of the CIT-17 of the disclosure, the Si/T-atom ratio is 0.083 as determined by EDS elemental analysis.

In some aspects of the disclosure, the CIT-17 is characterized by its pore volume. In some embodiments, the CIT-17 has a pore volume of about 0.1 cm$^3$/g to about 0.2 cm$^3$/g, such as, for example, about 0.1 cm$^3$/g, about 0.11 cm$^3$/g, about 0.12 cm$^3$/g, about 0.13 cm$^3$/g, about 0.14 cm$^3$/g, about 0.15 cm$^3$/g, about 0.16 cm$^3$/g, about 0.17 cm$^3$/g, about 0.18 cm$^3$/g, about 0.19 cm$^3$/g, or about 0.2 cm$^3$/g.

In some embodiments, the CIT-17 has a pore volume of 0.1 cm$^3$/g, 0.11 cm$^3$/g, 0.12 cm$^3$/g, 0.13 cm$^3$/g, 0.14 cm$^3$/g, 0.15 cm$^3$/g, 0.16 cm$^3$/g, 0.17 cm$^3$/g, 0.18 cm$^3$/g, 0.19 cm$^3$/g, or 0.2 cm$^3$/g.

In some embodiments, the CIT-17 has a pore volume of about 0.15 cm$^3$/g. In other embodiments, the CIT-17 has a pore volume of 0.15 cm$^3$/g.

In some aspects, the disclosure also provides Me-aluminophosphate-based molecular sieves having an SAT framework structure (MeAPO-SAT), wherein Me is a metal, and wherein the MeAPO-SAT is substantially free of a non-MeAPO-SAT phase.

In some embodiments of the MeAPO-SAT that is substantially free of a non-MeAPO-SAT phase, the Me is a rare earth, Group 1, Group 2, or transition metals, such as, for example Ca, Cd, Co, Cu, Fe, Mg, Mn, Ni, Pt, Pd, Re, Sn, Ti, V, W, Zn and their mixtures.

In some embodiments of the MeAPO-SAT that is substantially free of a non-MeAPO-SAT phase, the Me is magnesium (Mg) or cobalt (Co).

In some embodiments of the MeAPO-SAT that is substantially free of a non-MeAPO-SAT phase, the Me is magnesium (Mg).

In some embodiments of the MeAPO-SAT that is substantially free of a non-MeAPO-SAT phase, the Me is cobalt (Co).

Methods of Making the Compositions of the Disclosure

In some aspects, the disclosure provides methods of making CIT-17.

In general, the methods of making CIT-17 comprise:
a. preparing a synthesis gel by mixing a phosphorus source, water, an aluminum source, a silica source and an organic structure determining agent (OSDA);
b. aging the resulting synthesis gel;
c. heating the aged synthesis gel;
d. washing the resulting powder; and
e. drying the powder.

In some embodiments, the methods of making CIT-17 comprise:
a. preparing a synthesis gel by a process comprising:
  i. mixing a phosphorus source and water;
  ii. adding an aluminum source, and allowing the resulting gel to homogenize;
  iii. adding a silica source to the mixture; and
  iv. adding an organic structure determining agent (OSDA); and
b. aging the resulting synthesis gel at room temperature;
c. heating the aged synthesis gel;
d. washing the resulting powder; and
e. drying the powder.

In some embodiments, the methods of making CIT-17 comprise:
a. preparing a synthesis gel by a process comprising:
  i. mixing a phosphorus source and water, and stirring the resulting mixture for 10 minutes;
  ii. adding an aluminum source, and allowing the resulting gel to homogenize for 3-4 hours;
  iii. adding a silica source to the mixture;
  iv. adding an organic structure determining agent (OSDA);
b. aging the resulting synthesis gel at room temperature for 20-24 hours;
c. heating the aged synthesis gel to about 160-200° C.;
d. washing the resulting powder with distilled water and acetone;
e. drying the powder in a convection oven at about 80° C.

In some embodiments, the aged synthesis gel in step c. is heated to about 160-200° C., such as, for example, about 160° C., about 165° C., about 170° C., about 175° C., about 180° C., about 185° C., about 190° C., about 195° C., or about 200° C.

In some embodiments, the methods of making CIT-17 comprise:
a. preparing a synthesis gel by a process comprising:
  i. mixing a phosphorus source and water, and stirring the resulting mixture for 10 minutes;
  ii. adding an aluminum source, and allowing the resulting gel to homogenize for 3-4 hours;
  iii. adding a silica source to the mixture;
  iv. adding an organic structure determining agent (OSDA);
b. aging the resulting synthesis gel at room temperature for 20-24 hours;
c. heating the aged synthesis gel to about 190° C. in an oven for about 3 days;
d. washing the resulting powder with distilled water and acetone;
e. drying the powder in a convection oven at about 80° C.

In some embodiments, the oven used in step c. is a static oven. In other embodiments, the oven used in step c. is a rotating oven.

In some embodiments, the methods of making CIT-17 comprise:
a. preparing a synthesis gel by a process comprising:
  i. mixing a phosphorus source and water, and stirring the resulting mixture for 10 minutes;
  ii. adding an aluminum source, and allowing the resulting gel to homogenize for 3-4 hours;
  iii. adding a silica source to the mixture;
  iv. adding an organic structure determining agent (OSDA);
b. aging the resulting synthesis gel at room temperature for 20-24 hours;
c. heating the aged synthesis gel to about 190° C. in a rotating oven (55-60 rpm) at autogenous pressure for about 3 days;
d. washing the resulting powder with distilled water and acetone;
e. drying the powder in a convection oven at about 80° C.

In some embodiments, the phosphorus source used for making the CIT-17 of the disclosure is phosphoric acid. In other embodiments, the phosphorus source used for making the CIT-17 of the disclosure is $P_2O_5$.

In some embodiments, the aluminum source used for making the CIT-17 of the disclosure is aluminates, alumina, and aluminum compounds such as $AlCl_3$, $Al_2(SO_4)_3$, $Al(OH)_3$, kaolin clays, and other zeolites. In some embodiments, the aluminum source used for making the CIT-17 of the disclosure is aluminum hydroxide.

The silica (silicon oxide) source used in the methods of the disclosure may comprise a silicate, silica hydrogel, silicic acid, fumed silica, colloidal silica, tetra-alkyl orthosilicate, a silica hydroxide or combination thereof. In some embodiments, the silica source used for making the CIT-17 of the disclosure is fumed silica.

In embodiments, the OSDA is DiQ-C$_4$, DiQ-C$_5$, or DiD-ABCO-C$_4$.

In some embodiments, the OSDA is DiQ-C$_4$. As used herein, DiQ-C$_4$ refers to a dianion salt of 1,1'-(butane-1,4-diyl)bis(quinuclidin-1-ium):

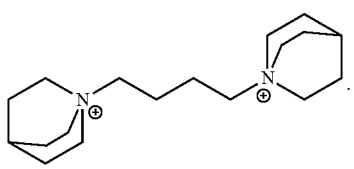 [SMILES: C(CC[N+]12CCC(CC1)CC2)C[N+]12CCC(CC1)CC2]

In some embodiments, DiQ-C$_4$ is used as the dibromide salt. In other embodiments, DiQ-C$_4$ is used as the dihydroxide salt. In yet other embodiments, DiQ-C$_4$ is used as a mixture of the hydroxide and bromide salts.

In other embodiments, the OSDA is DiQ-C$_5$. As used herein, DiQ-C$_5$ refers to a dianion salt of 1,1'-(pentane-1,5-diyl)bis(quinuclidin-1-ium):

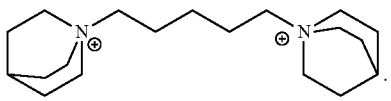 [SMILES: C(CC[N+]12CCC(CC1)CC2)CC[N+]12CCC(CC1)CC2]

In some embodiments, DiQ-C$_5$ is used as the dibromide salt. In other embodiments, DiQ-C$_5$ is used as the dihydroxide salt. In yet other embodiments, DiQ-C$_5$ is used as a mixture of the hydroxide and bromide salts.

In other embodiments, the OSDA is DiDABCO-C$_4$. As used herein, DiDABCO-C$_4$ refers to a dianion salt of 1,1'-(butane-1,4-diyl)bis(1,4-diazabicyclo[2.2.2]octan-1-ium):

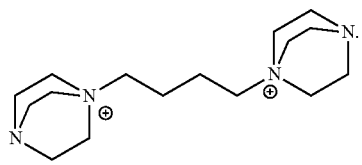 [SMILES: C(CC[N+]12CCN(CC1)CC2)C[N+]12CCN(CC1)CC2]

In some embodiments, DiDABCO-C$_4$ is used as the dibromide salt. In other embodiments, DiDABCO-C$_4$ is used as the dihydroxide salt. In yet other embodiments, DiDABCO-C$_4$ is used as a mixture of the hydroxide and bromide salts.

In some embodiments, the methods of making the CIT-17 of the disclosure comprise:
a. preparing a synthesis gel by a process comprising:
  i. mixing phosphoric acid (H$_3$PO$_4$) (85%) and water, and stirring the resulting mixture for about 5-20 minutes;
  ii. adding aluminum hydroxide, and allowing the resulting gel to homogenize for about 2-6 hours;
  iii. adding fumed silica to the mixture;
  iv. adding an organic structure determining agent (OSDA);
b. aging the resulting synthesis gel at about 15-35° C. for about 15-30 hours;
c. heating the aged synthesis gel to about 160-200° C. in an oven at autogenous pressure for about 1-5 days;
d. washing the resulting powder with distilled water and acetone;
e. drying the powder in a convection oven at about 60-100° C.

In some embodiments, the methods of making the CIT-17 of the disclosure comprise:
a. preparing a synthesis gel by a process comprising:
  i. mixing phosphoric acid (H$_3$PO$_4$) (85%) and water, and stirring the resulting mixture for about 10 minutes;
  ii. adding aluminum hydroxide, and allowing the resulting gel to homogenize for 3-4 hours;
  iii. adding fumed silica to the mixture;
  iv. adding an organic structure determining agent (OSDA);
b. aging the resulting synthesis gel at room temperature for 20-24 hours;
c. heating the aged synthesis gel to about 190° C. in a rotating oven (55-60 rpm) at autogenous pressure for about 3 days;
d. washing the resulting powder with distilled water and acetone;
e. drying the powder in a convection oven at about 80° C.

In some aspects of the methods of making the CIT-17 of the disclosure, the method further comprising thermally treating, or calcining, the powder that is the product of step e.

In some aspects of the methods of making the CIT-17 of the disclosure, the method further comprising thermally treating the powder that is the product of step e. under flowing air in a furnace by:
a. heating to about 120-180° C. and holding for about 1-5 h; and then
b. heating to about 550-600° C. and holding for about 8-18 h, or until complete combustion of any remaining OSDA has been accomplished.

In some embodiments of the methods of making the CIT-17 of the disclosure, the method further comprising thermally treating the powder that is the product of step e. under flowing air in a furnace by:
a. heating to about 150° C. and holding for about 3 h; and then
b. heating to about 580° C. and holding for about 12 h, or until complete combustion of any remaining OSDA has been accomplished.

In some aspects, the disclosure provides synthesis gels that are useful for producing the SAPO-SAT molecular sieve that is substantially free of a non-SAPO-SAT phase.

In some aspects of the methods of making CIT-17, the molar ratio of the components of the synthesis gel are critical in producing the SAPO-SAT molecular sieve that is substantially free of a non-SAPO-SAT phase. In some embodiments, the molar ratio of the OSDA in the synthesis gel is critical in producing the SAPO-SAT molecular sieve that is substantially free of a non-SAPO-SAT phase.

In some embodiments, the molar ratios in the synthesis gel are as follows:
0.06-0.15 SiO$_2$, such as, for example, 0.06, 0.07, 0.08, 0.09, 0.1, 0.11, 0.12, 0.13, 0.14, or 0.15;
0.44-0.5 Al$_2$O$_3$, such as, for example, 0.44, 0.45, 0.46, 0.47, 0.48, 0.49, or 0.5;
0.44-0.5 P$_2$O$_5$, such as, for example, 0.44, 0.45, 0.46, 0.47, 0.48, 0.49, or 0.5;
0.17-0.33 R(OH)$_2$, such as, for example, 0.17, 0.18, 0.19, 0.20, 0.21, 0.22, 0.23, 0.24, 0.25, 0.26, 0.27, 0.28, 0.29, 0.30, 0.31, 0.32, or 0.33, wherein R is DiQ-C$_4$, DiQ-C$_5$, or DiDABCO-C$_4$; and
40-75 H$_2$O, such as, for example, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75.

In other embodiments, the molar ratios in the synthesis gel are as follows:
0.1 SiO$_2$;
0.44-0.5 Al$_2$O$_3$, such as, for example, 0.44, 0.45, 0.46, 0.47, 0.48, 0.49, or 0.5;
0.44-0.5 P$_2$O$_5$, such as, for example, 0.44, 0.45, 0.46, 0.47, 0.48, 0.49, or 0.5;
0.2-0.33 R(OH)$_2$, such as, for example, 0.20, 0.21, 0.22, 0.23, 0.24, 0.25, 0.26, 0.27, 0.28, 0.29, 0.30, 0.31, 0.32, or 0.33, wherein R=DiDABCO-C$_4$, and 40-75 H$_2$O, such as, for example, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75.

In other embodiments, the molar ratios in the synthesis gel are as follows:
- 0.06-0.1 SiO$_2$, such as, for example, 0.06, 0.07, 0.08, 0.09, or 0.1;
- 0.5 Al$_2$O$_3$;
- 0.45-0.5 P$_2$O$_5$, such as, for example, 0.45, 0.46, 0.47, 0.48, 0.49, or 0.5;
- 0.17-0.33 R(OH)$_2$ such as, for example, 0.17, 0.18, 0.19, 0.20, 0.21, 0.22, 0.23, 0.24, 0.25, 0.26, 0.27, 0.28, 0.29, 0.30, 0.31, 0.32, or 0.33, wherein R=DiQ-C$_4$; and
- 40-75 H$_2$O, such as, for example, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75.

In other embodiments, the molar ratios in the synthesis gel are as follows:
- 0.06-0.15 SiO$_2$, such as, for example, 0.06, 0.07, 0.08, 0.09, 0.1, 0.11, 0.12, 0.13, 0.14, or 0.15;
- 0.5 Al$_2$O$_3$;
- 0.45-0.49 P$_2$O$_5$, such as, for example, 0.45, 0.46, 0.47, 0.48, or 0.49;
- 0.23-0.27 R(OH)$_2$, such as, for example, 0.23, 0.24, 0.25, 0.26, or 0.27, wherein R=DiQ-C$_5$; and
- 40 H$_2$O.

In yet other embodiments, the molar ratios in the synthesis gel are one of those set forth in Table 1 herein.

In some aspects, the disclosure provides methods of making MeAPO-SAT molecular sieves that are substantially free of non-MeAPO-SAT phase, wherein the methods comprise:
a. preparing a synthesis gel by a process comprising:
  i. mixing a phosphorus source and water;
  ii. adding an aluminum source, and allowing the resulting gel to homogenize;
  iii. adding a magnesium source or a cobalt source to the mixture;
  iv. adding an organic structure determining agent (OSDA);
b. aging the resulting synthesis gel;
c. heating the aged synthesis gel;
d. washing the resulting powder; and
e. drying the powder.

In some embodiments, the methods of making MeAPO-SAT molecular sieves that are substantially free of non-MeAPO-SAT phase comprise:
a. preparing a synthesis gel by a process comprising:
  i. mixing a phosphorus source and water, and stirring the resulting mixture for 10 minutes;
  ii. adding an aluminum source, and allowing the resulting gel to homogenize for 3-4 hours;
  iii. adding a magnesium source or a cobalt source to the mixture;
  iv. adding an organic structure determining agent (OSDA);
b. aging the resulting synthesis gel at room temperature for 20-24 hours;
c. heating the aged synthesis gel to about 190° C. in a rotating oven (55-60 rpm) at autogenous pressure for about 3 days;
d. washing the resulting powder with distilled water and acetone;
e. drying the powder in a convection oven at about 80° C.

In other embodiments, the methods of making MeAPO-SAT molecular sieves that are substantially free of non-MeAPO-SAT phase comprise:
a. preparing a synthesis gel by a process comprising:
  i. mixing phosphoric acid (H$_3$PO$_4$) (85%) and water, and stirring the resulting mixture for 10 minutes;
  ii. adding aluminum hydroxide, and allowing the resulting gel to homogenize for 3-4 hours;
  iii. adding cobalt (II) acetate tetrahydrate or magnesium acetate tetrahydrate to the mixture;
  iv. adding an organic structure determining agent (OSDA);
b. aging the resulting synthesis gel at room temperature for 20-24 hours;
c. heating the aged synthesis gel to about 190° C. in a rotating oven (55-60 rpm) at autogenous pressure for about 3 days;
d. washing the resulting powder with distilled water and acetone;
e. drying the powder in a convection oven at about 80° C.

In some aspects of the methods of making the MeAPO-SAT molecular sieves that are substantially free of non-MeAPO-SAT phase of the disclosure, the method further comprising thermally treating the powder that is the product of step e. under flowing air in a furnace by:
a. heating to about 120-180° C. and holding for about 1-5 h; and then
b. heating to about 550-600° C. and holding for about 8-18 h, or until complete combustion of any remaining OSDA has been accomplished.

In some embodiments of the methods of making the MeAPO-SAT molecular sieves that are substantially free of non-MeAPO-SAT phase of the disclosure, the method further comprising thermally treating the powder that is the product of step e. under flowing air in a furnace by:
a. heating to about 150° C. and holding for about 3 h; and then
b. heating to about 580° C. and holding for about 12 h, or until complete combustion of any remaining OSDA has been accomplished.

In some embodiments of the methods of making the MeAPO-SAT molecular sieves that are substantially free of non-MeAPO-SAT phase of the disclosure, the OSDA is DiQ-C$_4$, DiQ-C$_5$, or DiDABCO-C$_4$.

In some embodiments of the methods of making the MeAPO-SAT molecular sieves that are substantially free of non-MeAPO-SAT phase of the disclosure, the OSDA is DiQ-C$_4$.

In some embodiments of the methods of making the MeAPO-SAT molecular sieves that are substantially free of non-MeAPO-SAT phase of the disclosure, the OSDA is DiQ-C$_5$.

In some embodiments of the methods of making the MeAPO-SAT molecular sieves that are substantially free of non-MeAPO-SAT phase of the disclosure, the OSDA is DiDABCO-C$_4$.

In some aspects of the disclosed methods of making MeAPO-SAT molecular sieves that are substantially free of non-MeAPO-SAT phase the synthesis gel has a molar composition of:
- 0.02-0.08 cobalt (II) acetate tetrahydrate, such as, for example, 0.02, 0.03, 0.04, 0.05, 0.06, 0.07, or 0.08;
- 0.45-0.5 Al$_2$O$_3$, such as, for example, 0.45, 0.46, 0.47, 0.48, 0.49, or 0.5;
- 0.45-0.55 P$_2$O$_5$, such as, for example, 0.45, 0.46, 0.47, 0.48, 0.49, 0.50, 0.51, 0.52, 0.53, 0.54, or 0.55;

0.27-0.4 R(OH)$_2$, such as, for example, 0.27, 0.28, 0.29, 0.30, 0.31, 0.32, 0.33, 0.34, 0.35, 0.36, 0.37, 0.38, 0.39, or 0.4, wherein R is DiQ-C$_4$, DiQ-C$_5$, or DiDABCO-C$_4$; and 40-75 H$_2$O, such as, for example, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75.

In some aspects of the disclosed methods of making MeAPO-SAT molecular sieves that are substantially free of non-MeAPO-SAT phase the synthesis gel has a molar composition of:

0.1 magnesium acetate tetrahydrate;
0.45 Al$_2$O$_3$;
0.5 P$_2$O$_5$;
0.4 R(OH)$_2$ wherein wherein R is DiQ-C$_4$, DiQ-C$_5$, or DiDABCO-C$_4$; and
40 H$_2$O.

Oxygenate Conversion—Methanol-To-Olefin (MTO) Reaction

In some aspects, the disclosure provides processes for catalytic conversion of a feedstock comprising one or more oxygenates comprising alcohols and ethers to a hydrocarbon product containing light olefins, i.e., C$_2$, C$_3$ and/or C$_4$ olefins. In these aspects, the feedstock is contacted with a SAPO-SAT molecular sieve of the disclosure at effective process conditions to produce light olefins. The term "oxygenate" as used herein refers to oxygen-containing compounds such as alcohols, ethers, and carbonyl compounds (e.g., aldehydes, ketones, carboxylic acids). The oxygenate can contain from 1 to 10 carbon atoms, e.g., from 1 to 4 carbon atoms.

In some embodiments, the process is conducted in the presence of one or more diluents which can be present in the oxygenate feed in an amount of from 1 to 99 mole %, based on the total number of moles of all feed and diluent components. Diluents include helium, argon, nitrogen, carbon monoxide, carbon dioxide, hydrogen, water, paraffins, hydrocarbons (such as methane and the like), aromatic compounds, or mixtures thereof.

In some embodiments, the process is conducted in the vapor phase such that the oxygenate feedstock is contacted in a vapor phase in a reaction zone with SAPO-SAT molecular sieve of the disclosure at process conditions effective to produce hydrocarbons, i.e., an effective temperature, pressure, WHSV and, optionally, an effective amount of diluent. The process is conducted for a period of time sufficient to produce the desired light olefins. In general, the residence time employed to produce the desired product can vary from seconds to a number of hours. It will be readily appreciated that the residence time will be determined to a significant extent by the reaction temperature, the molecular sieve catalyst, the WHSV, the phase (liquid or vapor) and process design characteristics.

In some aspects, the process is conducted at a wide range of pressures, including but not limited to autogenous pressures and pressures in the range from 0.1 kPa to 10 MPa. In some embodiments, the pressure can be in the range from 7 kPa to 5 MPa, e.g., from 50 kPa to 1 MPa. The foregoing pressures are exclusive of diluents, if any are present, and refer to the partial pressure of the feedstock as it relates to oxygenate compounds and/or mixtures thereof.

In some embodiments, the temperature which can be employed in the oxygenate conversion process can vary over a wide range. In general, the process can be conducted at an effective temperature of from 250° C. to 600° C.

In some aspects, the SAPO-SAT molecular sieve of the disclosure can be incorporated into solid particles in which the catalyst is present in an amount effective to promote the desired conversion of oxygenates to light olefins. In one aspect, the solid particles comprise a catalytically effective amount of the catalyst and at least one matrix material such as binder materials, filler materials and mixtures thereof to provide a desired property or properties, e.g., desired catalyst dilution, mechanical strength and the like to the solid particles.

In some aspects, the disclosure provides processes for the production of propylene from a methanol-containing feed, wherein the process comprises passing the methanol-containing feed to a reactor, wherein the reactor comprises a catalyst comprising a SAPO-SAT molecular sieve, wherein the SAPO-SAT molecular sieve is substantially free of a non-SAPO-SAT phase, and wherein the reactor is operated at reaction conditions sufficient to generate an effluent stream comprising propylene and having a propylene to ethylene ratio between about 1.6 and about 4.2.

In other aspects, the disclosure provides processes for the production of propylene from a methanol-containing feed, the process comprising: passing the methanol-containing feed to a reactor, wherein the reactor comprises a catalyst comprising a MeAPO-SAT molecular sieve, wherein the MeAPO-SAT molecular sieve is substantially free of a non-MeAPO-SAT phase, wherein Me is cobalt or magnesium, and wherein the reactor is operated at reaction conditions sufficient to generate an effluent stream comprising propylene and having a propylene to ethylene ratio between about 1.6 and about 4.2.

In some embodiments of the MTO processes of the disclosure, the reactor is a fluidized bed, fixed bed, or swing fixed bed reactor.

In some embodiments of the MTO processes of the disclosure, the reactor is a fluidized bed reactor.

In other embodiments of the MTO processes of the disclosure, the reactor is a fixed bed reactor.

In yet other embodiments of the MTO processes of the disclosure, the reactor is swing fixed bed reactor.

In some embodiments of the MTO processes of the disclosure, the catalyst comprises a SAPO-SAT molecular sieve of the disclosure, that is, a SAPO-SAT molecular sieve that is substantially free of a non-SAPO-SAT phase.

In other embodiments of the MTO processes of the disclosure, the catalyst comprises a MeAPO-SAT molecular sieve of the disclosure, that is, a MeAPO-SAT molecular sieve that is substantially free of a non-MeAPO-SAT phase.

In some aspects, the MTO processes of the disclosure utilize a methanol-containing feed which is fed to the reactor. The methanol containing feed is a feed stream that comprises methanol. In some embodiments, the methanol-containing feed is methanol.

In some aspects of the MTO processes of the disclosure, the reactor is operated at reaction conditions sufficient to generate an effluent stream comprising propylene and having a propylene to ethylene ratio between about 1.6 and about 4.2, such as, for example, a propylene to ethylene ratio of about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, or about 4.2.

In some embodiments of the MTO processes of the disclosure, the reactor is operated at reaction conditions sufficient to generate an effluent stream comprising propylene and having a propylene to ethylene ratio between about 1.6 and about 4.2, such as, for example, a propylene to ethylene ratio of 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, or 4.2.

In some aspects of the MTO processes of the disclosure, the reactor is operated at ambient pressure.

In some aspects of the MTO processes of the disclosure, the reactor is operated at elevated pressure.

In some aspects of the MTO processes of the disclosure, the methanol-containing feed flow rate provides a weight hourly space velocity (WHSV) of about 0.6511 $h^{-1}$ to about 2.61 $h^{-1}$, such as, for example, about 0.65 $h^{-1}$, about 0.7 $h^{-1}$, about 0.75 $h^{-1}$, about 0.8 $h^{-1}$, about 0.8511 $h^{-1}$, about 0.9 $h^{-1}$, about 0.95 $h^{-1}$, about 1.0 $h^{-1}$, about 1.05 $h^{-1}$, about 1.1 $h^{-1}$, about 1.15 $h^{-1}$, about 1.2 $h^{-1}$, about 1.25 $h^{-1}$, about 1.3 $h^{-1}$, about 1.35 $h^{-1}$, about 1.4 $h^{-1}$, about 1.45 $h^{-1}$, about 1.5 $h^{-1}$, about 1.55 $h^{-1}$, about 1.6 $h^{-1}$, about 1.65 $h^{-1}$, about 1.7 $h^{-1}$, about 1.75 $h^{-1}$, about 1.8 $h^{-1}$, about 1.85 $h^{-1}$, about 1.9 $j^{-1}$, about 1.95 $h^{-1}$, about 2.0 $h^{-1}$, about 2.05 $h^{-1}$, about 2.1 $h^{-1}$, about 2.15 $h^{-1}$, about 2.2 $h^{-1}$, about 2.25 $h^{-1}$, about 2.3 $h^{-1}$, about 2.35 $h^{-1}$, about 2.4 $h^{-1}$, about 2.45 $h^{-1}$ about 2.5 $h^{-1}$, about 2.55 $h^{-1}$, or about 2.6 $h^{-1}$.

In some aspects of the MTO processes of the disclosure, the methanol-containing feed flow rate provides a weight hourly space velocity (WHSV) of about 0.65 $h^{-1}$ to about 2.6 $h^{-1}$, such as, for example, 0.65 $h^{-1}$ 0.7 $h^{-1}$, 0.75 $h^{-1}$, 0.8 $h^{-1}$, 0.85 $h^{-1}$, 0.9 $h^{-1}$, 0.95 $h^{-1}$, 1.0 $h^{-1}$, 1.05 $h^{-1}$, 1.1 $h^{-1}$, 1.15 $h^{-1}$, 1.2 $h^{-1}$, 1.25 $h^{-1}$, 1.3 $h^{-1}$, 1.35 $h^{-1}$, 1.4 $h^{-1}$, 1.45 $h^{-1}$, 1.5 $h^{-1}$, 1.55 $h^{-1}$, 1.6 $h^{-1}$, 1.65 $h^{-1}$, 1.7 $h^{-1}$, 1.75 $h^{-1}$, 1.8 $h^{-1}$, 1.85 $h^{-1}$, 1.9 $h^{-1}$, 1.95 $h^{-1}$, 2.0 $h^{-1}$, 2.05 $h^{-1}$, 2.1 $h^{-1}$, 2.15 $h^{-1}$, 2.2 $h^{-1}$, 2.25 $h^{-1}$, 2.3 $h^{-1}$, 2.35 $h^{-1}$, 2.4 $h^{-1}$, 2.45 $h^{-1}$, 2.5 $h^{-1}$, 2.55 $h^{-1}$, or 2.6 $h^{-1}$.

In some aspects of the MTO processes of the disclosure, the reactor is operated at a temperature of about 350° C.-about 600° C., such as, for example, about 350° C., about 355° C., about 360° C., about 365° C., about 370° C., about 375° C., about 380° C., about 385° C., about 390° C., about 395° C., about 400° C., about 405° C., about 410° C., about 415° C., about 420° C., about 425° C., about 430° C., about 435° C., about 440° C., about 445° C., about 450° C., about 455° C., about 460° C., about 465° C., about 470° C., about 475° C., about 480° C., about 485° C., about 490° C., about 495° C., about 500° C., about 505° C., about 510° C., about 515° C., about 520° C., about 525° C., about 530° C., about 535° C., about 540° C., about 545° C., about 550° C., about 555° C., about 560° C., about 565° C., about 570° C., about 575° C., about 580° C., about 585° C., about 590° C., about 595° C., or about 600° C.

In some aspects of the MTO processes of the disclosure, the reactor is operated at a temperature of 350° C.-600° C., such as, for example, 350° C., 355° C., 360° C., 365° C., 370° C., 375° C., 380° C., 385° C., 390° C., 395° C., 400° C., 405° C., 410° C., 415° C., 420° C., 425° C., 430° C., 435° C., 440° C., 445° C., 450° C., 455° C., 460° C., 465° C., 470° C., 475° C., 480° C., 485° C., 490° C., 495° C., 500° C., 505° C., 510° C., 515° C., 520° C., 525° C., 530° C., 535° C., 540° C., 545° C., 550° C., 555° C., 560° C., 565° C., 570° C., 575° C., 580° C., 585° C., 590° C., 595° C., or 600° C.

In some aspects of the MTO processes of the disclosure, the reactor is operated at a temperature of about 350° C.-about 400° C., such as, for example, about 350° C., about 355° C., about 360° C., about 365° C., about 370° C., about 375° C., about 380° C., about 385° C., about 390° C., about 395° C., or about 400° C.

In some aspects of the MTO processes of the disclosure, the reactor is operated at a temperature of 350° C.-400° C., such as, for example, 350° C., 355° C., 360° C., 365° C., 370° C., 375° C., 380° C., 385° C., 390° C., 395° C., or 400° C.

In some aspects of the MTO processes of the disclosure, greater than 97% of the methanol in the methanol-containing feed is converted, such as for example, greater than 97%, greater than 97.1%, greater than 97.2%, greater than 97.3%, greater than 97.4%, greater than 97.5%, greater than 97.6%, greater than 97.7%, greater than 97.8%, greater than 97.9%, greater than 98%, greater than 98.1%, greater than 98.2%, greater than 98.3%, greater than 98.4%, greater than 98.5%, greater than 98.6%, greater than 98.7%, greater than 98.8%, greater than 98.9%, greater than 99%, greater than 99.1%, greater than 99.2%, greater than 99.3%, greater than 99.4%, greater than 99.5%, greater than 99.6%, greater than 99.7%, greater than 99.8%, or greater than 99.9%.

In some embodiments of the MTO processes of the disclosure, the catalyst is first pretreated by heating to an elevated temperature, and holding at that temperature for a period of time under flowing air.

In some embodiments of the MTO processes of the disclosure, the catalyst is first pretreated by heating to about 150° C. at 1° C./min, holding for about 3 h, and then heated further to about 580° C. at 1° C./min and holding for about 12 h under flowing air (breathing-grade D).

In some embodiments of the MTO processes of the disclosure, after the catalyst deactivates (as shown by either its conversion drops below 85% or DME selectivity surpasses 50%), the methanol-containing feed is shut shut off and the catalyst is cooled before being re-activated (air) by heating to an elevated temperature, and holding at that temperature for a period of time under flowing air.

In other embodiments of the MTO processes of the disclosure, after the catalyst deactivates (as shown by either its conversion drops below 85% or DME selectivity surpasses 50%), the methanol-containing feed is shut shut off and the catalyst is cooled before being re-activated (air) by heating to about 150° C. at 1° C./min, holding for about 3 h, and then heated further to about 580° C. at 1° C./min and holding for about 12 h under flowing air (breathing-grade D).

In other embodiments of the MTO processes of the disclosure, after the catalyst deactivates (as shown by either its conversion drops below 85% or DME selectivity surpasses 50%), the methanol-containing feed is shut shut off and the catalyst is cooled to approximately 100° C. before being re-activated (air) by heating to an elevated temperature, and holding at that temperature for a period of time under flowing air.

In other embodiments of the MTO processes of the disclosure, after the catalyst deactivates (as shown by either its conversion drops below 85% or DME selectivity surpasses 50%), the methanol-containing feed is shut shut off and the catalyst is cooled to approximately 100° C. before being re-activated (air) by heating to about 150° C. at 1° C./min, holding for about 3 h, and then heated further to about 580° C. at 1° C./min and holding for about 12 h under flowing air (breathing-grade D).

Other Uses

The SAPO-SAT molecular sieves of the disclosure also are useful in other applications, including as an adsorbent for gas separations; as a catalyst for making small amines; to reduce oxides of nitrogen in a gas streams, such as automobile exhaust; as a cold start hydrocarbon trap in combustion engine pollution control systems; and for trapping $C_3$ fragments.

Gas Separation

The SAPO-SAT molecular sieves of the disclosure can be used to separate gases. For example, they can be used to separate carbon dioxide from natural gas. Typically, the molecular sieve is used as a component in a membrane that is used to separate the gases. Examples of such membranes are disclosed in U.S. Pat. No. 6,508,860.

Synthesis of Amines

The SAPO-SAT molecular sieves of the disclosure can be used in a catalyst to prepare methylamine or dimethylamine. Dimethylamine is generally prepared in industrial quantities by continuous reaction of methanol (and/or dimethyl ether) and ammonia in the presence of a silica-alumina catalyst. The reactants are typically combined in the vapor phase, at temperatures of from 300° C. to 500° C., and at elevated pressures. Such a process is disclosed in U.S. Pat. No. 4,737,592.

Reduction of Oxides of Nitrogen (NOx)

The SAPO-SAT molecular sieves of the disclosure can be used for the catalytic reduction of the oxides of nitrogen in a gas stream. Typically, the gas stream also contains oxygen, often a stoichiometric excess thereof. Also, the molecular sieve can contain a metal or metal ions within or on it which are capable of catalyzing the reduction of the nitrogen oxides. Examples of such metals or metal ions include lanthanum, chromium, manganese, iron, cobalt, rhodium, nickel, palladium, platinum, copper, zinc, and mixtures thereof. See, e.g., U.S. Pat. No. 4,297,328.

Treatment of Engine Exhaust (Cold Start Emissions)

The SAPO-SAT molecular sieves of the disclosure can also be used in adsorbent beds to adsorb the hydrocarbons during the cold start portion of the engine. Although the process typically will be used with hydrocarbon fuels, the present disclosure can also be used to treat exhaust streams from alcohol-fueled engines. The adsorbent bed is typically placed immediately before the catalyst. Thus, the exhaust stream is first flowed through the adsorbent bed and then through the catalyst. The adsorbent bed preferentially adsorbs hydrocarbons over water under the conditions present in the exhaust stream. After a certain amount of time, the adsorbent bed has reached a temperature (typically about 150° C.) at which the bed is no longer able to remove hydrocarbons from the exhaust stream. That is, hydrocarbons are actually desorbed from the adsorbent bed instead of being adsorbed. This regenerates the adsorbent bed so that it can adsorb hydrocarbons during a subsequent cold start. The use of adsorbent beds to minimize hydrocarbon emissions during a cold start engine operation is known in the art. See, for example, U.S. Pat. Nos. 2,942,932; 3,699,683; and 5,078,979.

In some embodiments, the engine exhaust gas stream which is to be treated is flowed over a molecular sieve bed comprising SAPO-SAT molecular sieves of the disclosure as a first exhaust stream. The first exhaust stream which is discharged from the molecular sieve bed is now flowed over a catalyst to convert the pollutants contained in the first exhaust stream to innocuous components and provide a treated exhaust stream which is discharged into the atmosphere. It is understood that prior to discharge into the atmosphere, the treated exhaust stream can be flowed through a muffler or other sound reduction apparatus well known in the art.

When the molecular sieve bed reaches a sufficient temperature, typically from 150° C. to 200° C., the pollutants which are adsorbed in the bed begin to desorb and are carried by the first exhaust stream over the catalyst. At this point the catalyst has reached its operating temperature and is therefore capable of fully converting the pollutants to innocuous components. Exemplary uses of molecular sieves in this manner are given in U.S. Pat. No. 9,700,878.

The disclosure is also directed to the following aspects:

Aspect 1. A silicoaluminophosphate-based molecular sieve having an SAT framework structure (SAPO-SAT), wherein the SAPO-SAT is substantially free of a non-SAPO-SAT phase.

Aspect 2. The SAPO-SAT of aspect 1, wherein the SAPO-SAT is substantially free of SAPO-AFX.

Aspect 3. The SAPO-SAT of aspect 1 or aspect 2, wherein the Si/T-atom ratio is from about 0.068 to about 0.094 as determined by EDS elemental analysis, wherein T=Si+Al+P.

Aspect 4. The SAPO-SAT of aspect 3, wherein the Si/T-atom ratio is 0.083 as determined by EDS elemental analysis, wherein T=Si+Al+P.

Aspect 5. The SAPO-SAT of any one of aspects 1 to 4, wherein the SATO-SAT has a pore volume of about 0.15 cm$^3$/g.

Aspect 6. The SAPO-SAT of any one of aspects 1 to 5, wherein the SATO-SAT has an XRD substantially the same as that shown in FIG. 4.

Aspect 7. A process for making the SAPO-SAT molecular sieve of any one of aspects 1-6, the process comprising:
  a. preparing a synthesis gel by a process comprising:
    i. mixing a phosphorus source and water, and stirring the resulting mixture for 10 minutes;
    ii. adding an aluminum source, and allowing the resulting gel to homogenize for 3-4 hours;
    iii. adding a silica source to the mixture;
    iv. adding an organic structure determining agent (OSDA);
  b. aging the resulting synthesis gel at room temperature for 20-24 hours;
  c. heating the aged synthesis gel to about 160-200° C. for about 3 days;
  d. washing the resulting powder with distilled water and acetone;
  e. drying the powder in a convection oven at about 80° C.

Aspect 8. The process of aspect 7, the process comprising:
  a. preparing a synthesis gel by a process comprising:
    i. mixing phosphoric acid (H$_3$PO$_4$) (85%) and water, and stirring the resulting mixture for 10 minutes;
    ii. adding aluminum hydroxide, and allowing the resulting gel to homogenize for 3-4 hours;
    iii. adding fumed silica to the mixture;
    iv. adding an organic structure determining agent (OSDA);
  b. aging the resulting synthesis gel at room temperature for 20-24 hours;
  c. heating the aged synthesis gel to about 160-200° C. for about 3 days;
  d. washing the resulting powder with distilled water and acetone;
  e. drying the powder in a convection oven at about 80° C.

Aspect 9. The process of aspect 7 or aspect 8, further comprising thermally treating the powder that is the product of step e. under flowing air in a furnace by:
  a. heating to about 150° C. and holding for about 3 h; and then
  b. heating to about 580° C. and holding for about 12 h, or until complete combustion of any remaining OSDA has been accomplished.

Aspect 10. The process of any one of aspects 7-9, wherein the OSDA is DiQ-$C_4$, DiQ-$C_5$, or DiDABCO-$C_4$.

Aspect 11. The process of any one of aspects 7-10, wherein the synthesis gel has a molar composition of:
0.06-0.15 $SiO_2$;
0.44-0.5 $Al_2O_3$;
0.44-0.5 $P_2O_5$;
0.17-0.33 R(OH)$_2$ wherein R is DiQ-$C_4$, DiQ-$C_5$, or DiDABCO-$C_4$; and
40-75 $H_2O$ Aspect 12. The process of any one of aspects 7-10, wherein the synthesis gel has a molar composition of:
$SiO_2$;
0.44-0.5 $Al_2O_3$;
0.44-0.5 $P_2O_5$;
0.2-0.33 R(OH)$_2$ wherein R=DiDABCO-$C_4$; and
40-75 $H_2O$.

Aspect 13. The process of any one of aspects 7-10, wherein the synthesis gel has a molar composition of:
0.06-0.1 $SiO_2$;
0.5 $Al_2O_3$;
0.45-0.5 $P_2O_5$;
0.17-0.33 R(OH)$_2$ wherein R=DiQ-$C_4$; and
40-75 $H_2O$.

Aspect 14. The process of any one of aspects 7-10, wherein the synthesis gel has a molar composition of:
0.06-0.15 $SiO_2$;
0.5 $Al_2O_3$;
0.45-0.49 $P_2O_5$;
0.23-0.27 R(OH)$_2$ wherein R=DiQ-$C_5$; and
40 $H_2O$.

Aspect 15. A process for the production of propylene from a methanol-containing feed, the process comprising: passing the methanol-containing feed to a reactor, wherein the reactor comprises a catalyst comprising a SAPO-SAT molecular sieve, wherein the SAPO-SAT molecular sieve is substantially free of a non-SAPO-SAT phase, and wherein the reactor is operated at reaction conditions sufficient to generate an effluent stream comprising propylene and having a propylene to ethylene ratio between about 1.6 and about 4.2.

Aspect 16. A process for the production of propylene from a methanol-containing feed, the process comprising: passing, the methanol-containing feed to a reactor, wherein the reactor comprises a catalyst comprising a MeAPO-SAT molecular sieve, wherein the MeAPO-SAT molecular sieve is substantially free of a non-MeAPO-SAT phase, wherein Me is cobalt or magnesium, and wherein the reactor is operated at reaction conditions sufficient to generate an effluent stream comprising propylene and having a propylene to ethylene ratio between about 1.6 and about 4.2.

Aspect 17. The process of aspect 15 or aspect 16, wherein the reactor is a fluidized bed, fixed bed, or swing fixed bed reactor.

Aspect 18. The process of any one of aspects 15-17, wherein the process is operated at ambient pressure.

Aspect 19. The process of any one of aspects 15-18, wherein the methanol-containing feed flow rate provides a weight hourly space velocity (WHSV) of about 0.65 $h^{-1}$ to about 2.6 $h^{-1}$.

Aspect 20. The process of any one of aspects 15-19, wherein the reactor is operated at a temperature of about 350° C.-about 600° C.

Aspect 21. The process of any one of aspects 15-20, wherein greater than 97% of the methanol in the methanol-containing feed is converted.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1: Synthesis of DiQ-$C_4$

DiQ-$C_4$ was prepared from the reaction of quinuclidine (97%, Alfa Aesar) and 1,4-dibromobutane (99%, Sigma Aldrich). In a typical synthesis, quinuclidine (100 mmol) was mixed with 150 cm$^3$ of methanol and stirred at room temperature for a few minutes. The solution was then heated to 45° C. in an oil bath. After reaching 45° C., 1,4-dibromobutane (35 mmol) was added dropwise to the quinuclidine-containing solution while stirring. After adding 1,4-dibromobutane, the reaction mixture was heated to 80° C. and refluxed for 6 days. Methanol was then evaporated using a rotary evaporator, and the solid product was filtered and washed with methanol, diethyl ether, and acetone. Following this, the solid was dried under vacuum at room temperature for 6-8 h. The $^{13}$C NMR spectrum of DiQ-$C_4$ OSDA in its bromide form is shown in FIG. 1.

The OSDA was then converted to its hydroxide form, and its concentration was determined by titration. The OSDA above was first ion-exchanged into its hydroxide form by dissolving the organic salt in DI water and then adding DOWEX™ Monosphere™ 550A hydroxide ion-exchange resin. Specifically, for every 100 mmol of OSDA in the halide form, approximately 300 cm$^3$ (by volume) of resin and 500 cm$^3$ of DI water were added. The mixture was then stirred for 24 h at room temperature. After 24 h, the resin was separated by filtration, and the process was repeated a second time. The concentration of the OSDA, now in the hydroxide form, was quantified using a Mettler Toledo DL22 Potentiometric pH meter. Five readings were taken for each OSDA concentration, and these values were then averaged and used for gel calculations.

Example 2: Synthesis of DiQ-$C_5$

Figure 2:
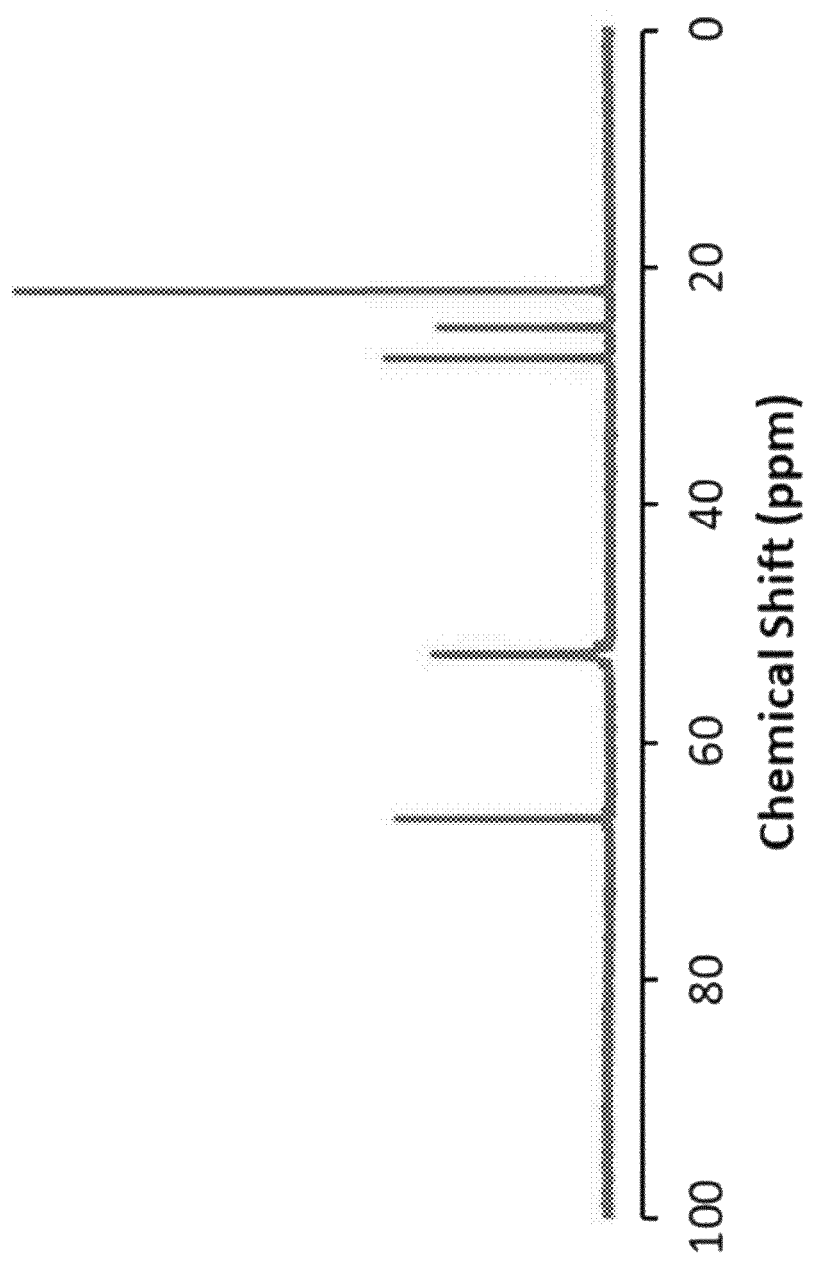
FIG. 2 shows the $^{13}$C-NMR of DiQ-C$_5$ dissolved in D$_2$O.

DiQ-$C_5$ was prepared from the reaction of quinuclidine (97%, Alfa Aesar) and 1,5-dibromopentane (97%, Sigma Aldrich). In a typical synthesis, quinuclidine (100 mmol) was mixed with 150 cm$^3$ of acetone and stirred at room temperature for a few minutes. The solution was then heated to 45° C. in an oil bath. After reaching 45° C., 1,5-dibromopentane (35 mmol) was added dropwise to the quinuclidine-containing solution while stirring. After adding 1,5-dibromopentane, the reaction mixture was heated to 80° C. and refluxed for 6 days. Acetone was then evaporated using a rotary evaporator, and the solid product was filtered and washed with diethyl ether and acetone. Following this, the solid was dried under vacuum at room temperature for 6-8 h. The $^{13}$C NMR spectrum of DiQ-$C_5$ OSDA in its bromide form is shown in FIG. 2. The OSDA was then converted to its hydroxide form, and its concentration was determined by titration in a similar fashion as described in Example 1.

Example 3: Synthesis of DiDABCO-C$_4$

Figure 3:
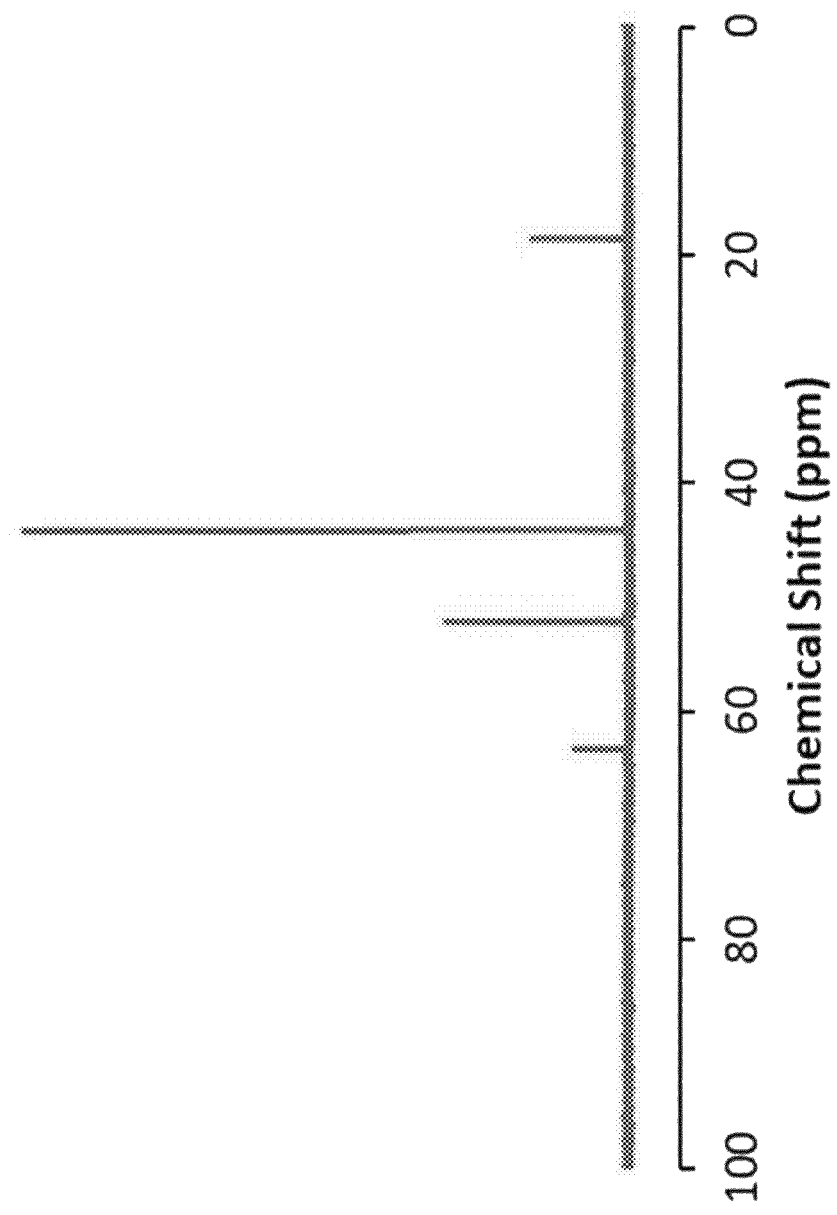
FIG. 3 shows the $^{13}$C-NMR of DiDABCO-C$_4$ dissolved in D$_2$O.

DiDABCO-C$_5$ was prepared from the reaction of 1,4-diazabicyclo[2.2.2]octane (abbreviated as DABCO) (Sigma Aldrich) and 1,4-dibromobutane (99%, Sigma Aldrich). In a typical synthesis, DABCO (600 mmol) was mixed with 150 cm$^3$ of methanol and stirred at room temperature for a few minutes. The solution was then heated to 45° C. in an oil bath. After reaching 45° C., 1,4-dibromobutane (75 mmol) was added dropwise to the DABCO-containing solution while stirring. After adding 1,4-dibromobutane, the reaction mixture was heated to 80° C. and refluxed for 6 days. Methanol was then evaporated using a rotary evaporator, and the solid product was filtered and washed with methanol, diethyl ether and acetone. Following this, the solid was dried under vacuum at room temperature for 6-8 h. The $^{13}$C NMR spectrum of DiDABCO-C$_4$ OSDA in its bromide form is shown in FIG. 3. The OSDA was then converted to its hydroxide form, and its concentration was determined by titration in a similar fashion as described in Example 1.

Example 4: Synthesis of CIT-17

All CIT-17 materials were prepared in 23 cm$^3$ stainless steel Parr autoclaves with Teflon liners. In a typical synthesis, a desired amount of phosphoric acid (H$_3$PO$_4$) (85%, MACRON) was mixed with an appropriate amount of water, and the mixture was stirred for 10 mins. Next, the aluminum source (Barcroft™ 0250 dried aluminum hydroxide gel, SPI Pharma) was weighed separately and added to this mixture. This gel was allowed to homogenize for 3-4 hours before adding fumed silica (Cab-O-Sil®, ACROS). Following the addition of silica, the OSDA (DiQ-C$_5$) was added, and the gel was aged at room temperature for 20-24 hours before being heated to 190° C. in a rotating oven (55-60 rpm) at autogenous pressure for 3 days. A synthesis gel molar composition for CIT-17 was: 0.15 SiO$_2$:0.5 Al$_2$O$_3$:0.49 P$_2$O$_5$:0.27 R(OH)$_2$:40 H$_2$O, where R=DiQ-C$_5$. The resultant powder was washed carefully with distilled water and acetone and then dried in an 80° C. convection oven before being characterized using a battery of techniques.

Example 5: Characterization of As-Synthesized CIT-17

Figure 5:
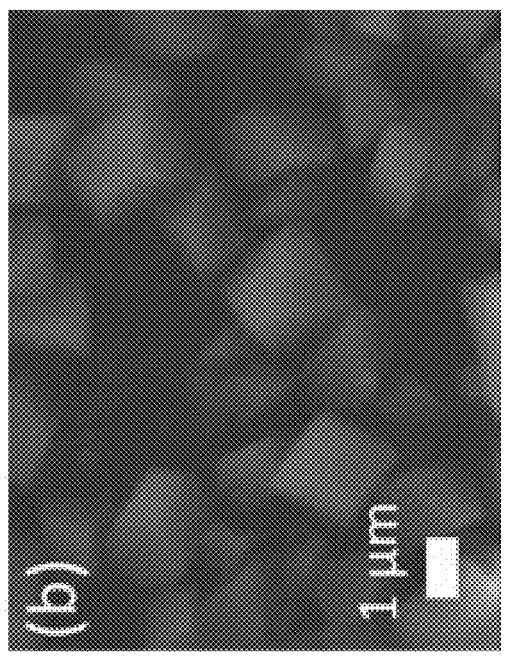
FIG. 5 shows SEM images of as-synthesized CIT-17 (Example 4). A Scale bar=2 microns; B. Scale bar=1 micron.
Figure 5:
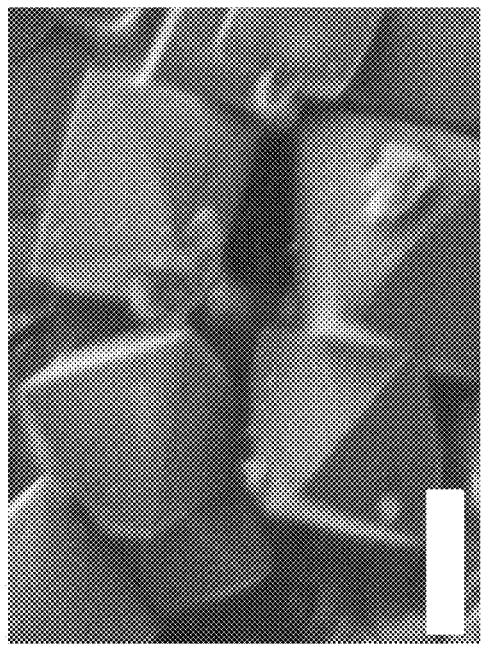
Figure 6:
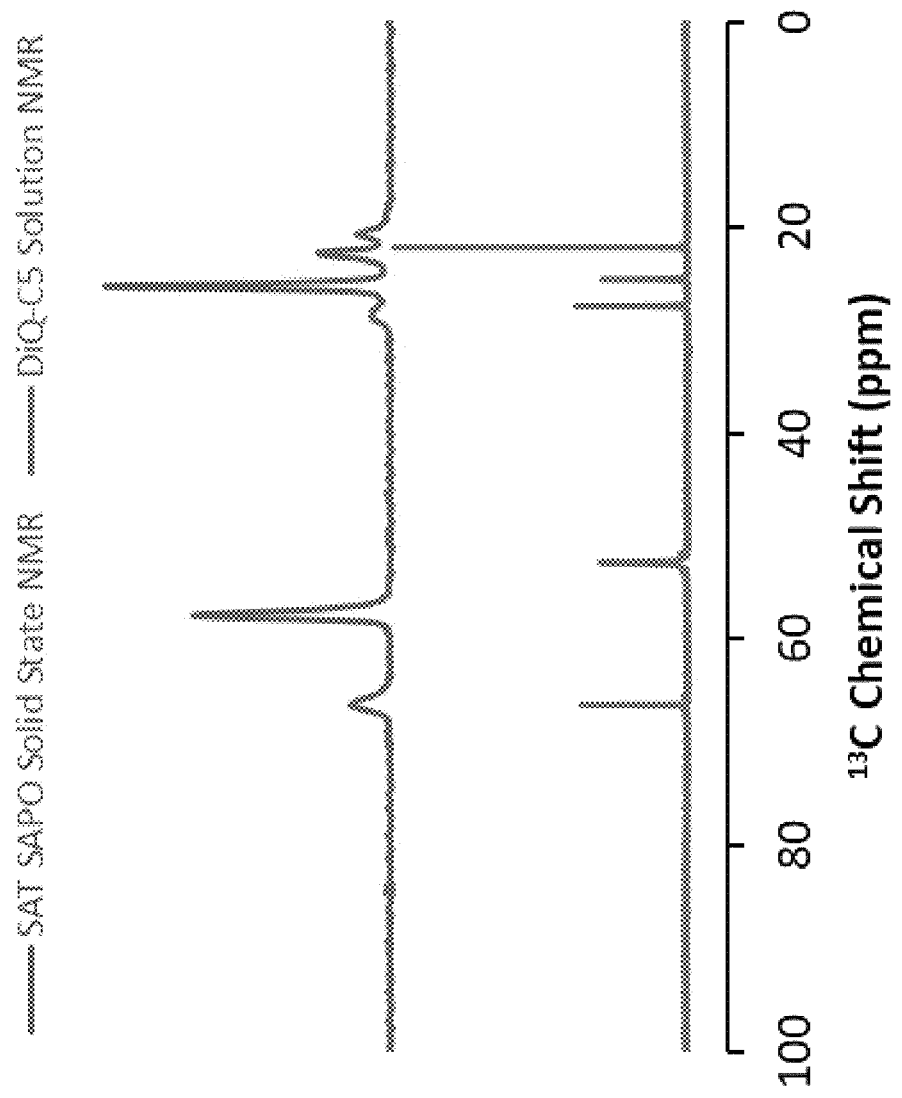
FIG. 6 shows the $^{13}$C-NMR of the (a) solution NMR of the DiQ-C$_5$ OSDA used in this work in its bromide form (bottom), and (b) of the solid-state NMR (top).

The dried CIT-17 sample from Example 4 was characterized using powder X-ray diffraction (XRD) on a Rigaku Miniflex II diffractometer with Cu Kα radiation (wavelength=1.5418 Å). The obtained powder XRD (PXRD) diffraction pattern of the as-synthesized CIT-17 product is shown in FIG. 4. The PXRD pattern obtained for CIT-17 is consistent with that of pure STA-2 (MgAPO-SAT). Scanning electron microscopy (SEM) was also performed on a FE-SEM microscope (ZEISS 1550VP) that is connected to an Energy Dispersive Spectrometer (EDS) system (Oxford X-Max SDD), for elemental analysis. An SEM image of the as-synthesized CIT-17 product is shown in FIG. 5. The formed CIT-17 product has a Si/T-atom=0.083 (T=Si+Al+P) as determined by EDS elemental analysis. $^{13}$C NMR was performed on the as-synthesized CIT-17 sample, to assess if the structure of the OSDA remains unchanged during synthesis (FIG. 6). Thermogravimetric analysis (TGA) was performed on a Perken Elmer STA6000. A portion of the as-synthesized sample was placed in a crucible and heated at 10° C./min in a flowing stream of air (0.33 cm$^3$/s). The TGA profile is shown in FIG. 7.

Example 6: Characterization of Thermally Treated CIT-17

The CIT-17 sample from Example 4 was thermally treated (in a ceramic calcination boat) under flowing breathing-grade air in a Nabertherm DKN400 muffle furnace. The sample was initially heated to 150° C. at a heating rate of 1° C./min and held for 3 h before being heated to 580° C. (again at a heating rate of 1° C./min) and held for 12 h to ensure complete combustion of any remaining OSDA. Solid-state, magic-angle spinning nuclear magnetic resonance (MAS NMR) spectroscopy experiments were conducted on a Bruker 500 MHz spectrometer using a 4 mm ZrO$_2$ rotor. In a typical experiment, the thermally treated sample was dehydrated under vacuum (10$^{-2}$ Torr) at 400° C. for 10 h at a ramp rate of 2° C./min in a dehydration manifold after being pre-packed in an uncapped NMR rotor. The rotor was then capped while under vacuum and inside the dehydration manifold (to minimize sample exposure to moisture) and then loaded into the spectrometer. For $^{29}$Si MAS NMR spectroscopy, this procedure was modified by introducing oxygen to the dehydrated sample to reduce the relaxation time before packing the rotor. The coordinations of Al, P, and Si in the thermally treated CIT-17 sample are shown in FIGS. 8-10. $^1$H MAS NMR is shown in FIG. 11. To determine micropore volume using the t-plot method and ensure the absence of mesoporosity, N$_2$-adsorption/desorption experiments were performed at 77 K in a Quantachrome Autosorb iQ adsorption instrument using a constant-dose method. Prior to adsorption measurements, the CIT-17 sample was outgassed at 60° C. for 0.5 h, followed by holds of 0.5 h at 120° C. and 6 h at 350° C. (all ramping rates were 1° C./min). The measured pore volume was 0.15 cm$^3$/g, measured at P/P$_0$=0.01. The N$_2$-adsorption-desorption isotherms are shown in FIG. 12.

Examples 7-53: Syntheses of CIT-17 Using Various OSDAs and Gel Compositions

Several SAT-type materials, including numerous CIT-17s, were synthesized based on the synthesis procedure from Example 4 with some modifications (e.g., Si/Al or Al/P content, type of oven, temperature, presence of seed, etc.). A summary of these results is shown in Table 1. Three OSDAs were tested (from Examples 1-3) at different gel compositions. The original STA-2 synthesis procedure was also reproduced (Examples 29-30). In cases where Co and Mg were used in the gel, cobalt (cobalt (II) acetate tetrahydrate, Sigma Aldrich) and magnesium acetate (Mg-acetate tetrahydrate; 99%, Sigma-Aldrich) were used as Co and Mg sources, respectively. Following synthesis, the resultant powders were washed carefully with distilled water and acetone and then dried in an 80° C. convection oven before being characterized using PXRD. PXRD patterns of a select group of samples are shown in FIGS. 13-16.

TABLE 1

Products and gel chemical compositions of SAT-type molecular sieves.

| Example | Al$_2$O$_3$ | P$_2$O$_5$ | SiO$_2$ | Co | Mg | OSDA | R$_{(total)}$[a] | R(OH)$_2$ | H$_2$O | Temperature (° C.) | Time (h) | Rotation[b] | Seed (1 wt %)[b] | Product XRD[c] |
|---|---|---|---|---|---|---|---|---|---|---|---|---|---|---|
| 7 | 0.45 | 0.5 | 0.1 | 0 | 0 | DiQ-C4 | 0.40 | 0.40 | 40 | 190 | 48 | N | N | CIT-16P + SAT |
| 8 | 0.5 | 0.45 | 0.1 | 0 | 0 | DiQ-C4 | 0.24 | 0.24 | 40 | 190 | 72 | Y | N | CIT-16P + SAT |
| 9 | 0.5 | 0.45 | 0.08 | 0 | 0 | DiQ-C4 | 0.24 | 0.24 | 40 | 190 | 72 | Y | N | CIT-16P + SAT |
| 10 | 0.5 | 0.45 | 0.15 | 0 | 0 | DiQ-C4 | 0.21 | 0.21 | 40 | 190 | 72 | Y | N | SAT + impurity |
| 11 | 0.5 | 0.45 | 0.1 | 0 | 0 | DiQ-C4 | 0.21 | 0.21 | 40 | 190 | 72 | Y | N | SAT |
| 12 | 0.5 | 0.45 | 0.08 | 0 | 0 | DiQ-C4 | 0.21 | 0.21 | 40 | 190 | 72 | Y | N | SAT |
| 13 | 0.5 | 0.45 | 0.06 | 0 | 0 | DiQ-C4 | 0.21 | 0.21 | 40 | 190 | 72 | Y | N | SAT |
| 14 | 0.5 | 0.45 | 0.08 | 0 | 0 | DiQ-C4 | 0.21 | 0.21 | 40 | 180 | 96 | Y | N | SAT |
| 15 | 0.5 | 0.45 | 0.08 | 0 | 0 | DiQ-C4 | 0.21 | 0.21 | 40 | 200 | 72 | Y | N | SAT |
| 16 | 0.5 | 0.45 | 0.12 | 0 | 0 | DiQ-C4 | 0.19 | 0.19 | 40 | 190 | 72 | Y | N | SAT + impurity |
| 17 | 0.5 | 0.45 | 0.1 | 0 | 0 | DiQ-C4 | 0.19 | 0.19 | 40 | 190 | 72 | Y | N | SAT |
| 18 | 0.5 | 0.45 | 0.08 | 0 | 0 | DiQ-C4 | 0.19 | 0.19 | 40 | 190 | 72 | Y | N | SAT |
| 19 | 0.5 | 0.45 | 0.1 | 0 | 0 | DiQ-C4 | 0.17 | 0.17 | 40 | 190 | 72 | Y | N | SAT |
| 20 | 0.5 | 0.45 | 0.08 | 0 | 0 | DiQ-C4 | 0.17 | 0.17 | 40 | 190 | 72 | Y | N | SAT |
| 21 | 0.5 | 0.5 | 0.1 | 0 | 0 | DiQ-C4 | 0.27 | 0.27 | 40 | 190 | 72 | N | N | SAT + AFX |
| 22 | 0.5 | 0.48 | 0.1 | 0 | 0 | DiQ-C4 | 0.25 | 0.25 | 40 | 190 | 72 | N | N | SAT |
| 23 | 0.5 | 0.45 | 0.1 | 0 | 0 | DiQ-C4 | 0.26 | 0.26 | 60 | 190 | 72 | N | N | SAT |
| 24 | 0.5 | 0.45 | 0.08 | 0 | 0 | DiQ-C4 | 0.33 | 0.33 | 75 | 190 | 96 | Y | Y | SAT |
| 25 | 0.5 | 0.5 | 0.08 | 0 | 0 | DiQ-C4 | 0.33 | 0.33 | 75 | 190 | 96 | Y | Y | SAT |
| 26 | 0.5 | 0.45 | 0.1 | 0 | 0 | DiQ-C4 | 0.27 | 0.22 | 40 | 190 | 72 | Y | N | SAT |
| 27 | 0.5 | 0.45 | 0.1 | 0 | 0 | DiQ-C4 | 0.27 | 0.19 | 40 | 190 | 72 | Y | N | SAT |
| 28 | 0.5 | 0.45 | 0.1 | 0 | 0 | DiQ-C4 | 0.27 | 0.16 | 40 | 190 | 72 | Y | N | SAT |
| 29 | 0.45 | 0.5 | 0 | 0 | 0.1 | DiQ-C4 | 0.4 | 0.4 | 40 | 190 | 48 | N | N | MgAPO-SAT |
| 30 | 0.45 | 0.5 | 0 | 0 | 0.1 | DiQ-C4 | 0.4 | 0.4 | 40 | 190 | 72 | N | N | MgAPO-SAT |
| 31 | 0.45 | 0.5 | 0 | 0.1 | 0 | DiQ-C4 | 0.27 | 0.27 | 40 | 190 | 72 | N | N | CoAPO-SAT + CIT-16P |
| 32 | 0.5 | 0.45 | 0.075 | 0.025 | 0 | DiQ-C4 | 0.27 | 0.27 | 40 | 190 | 72 | Y | N | CoSAPO-SAT |
| 33 | 0.5 | 0.45 | 0.05 | 0.05 | 0 | DiQ-C4 | 0.27 | 0.27 | 40 | 190 | 72 | Y | N | CoAPO-SAT |
| 34 | 0.45 | 0.525 | 0 | 0.08 | 0 | DiQ-C4 | 0.4 | 0.4 | 75 | 190 | 72 | Y | Y | CoAPO-SAT |
| 35 | 0.45 | 0.55 | 0 | 0.08 | 0 | DiQ-C4 | 0.4 | 0.4 | 75 | 190 | 72 | Y | Y | CoAPO-SAT |
| 36 | 0.5 | 0.49 | 0.2 | 0 | 0 | DiQ-C5 | 0.27 | 0.27 | 40 | 190 | 72 | Y | N | SAT + impurity |
| 37 | 0.5 | 0.49 | 0.15 | 0 | 0 | DiQ-C5 | 0.27 | 0.27 | 40 | 190 | 72 | Y | N | SAT |
| 38 | 0.5 | 0.49 | 0.1 | 0 | 0 | DiQ-C5 | 0.27 | 0.27 | 40 | 190 | 72 | Y | N | SAT |
| 39 | 0.5 | 0.49 | 0.1 | 0 | 0 | DiQ-C5 | 0.23 | 0.23 | 40 | 190 | 72 | Y | N | SAT |
| 40 | 0.5 | 0.45 | 0.08 | 0 | 0 | DiQ-C5 | 0.23 | 0.23 | 40 | 190 | 72 | Y | N | SAT |
| 41 | 0.5 | 0.45 | 0.06 | 0 | 0 | DiQ-C5 | 0.23 | 0.23 | 40 | 190 | 72 | Y | N | SAT |
| 42 | 0.5 | 0.49 | 0.05 | 0 | 0 | DiQ-C5 | 0.23 | 0.23 | 40 | 190 | 72 | Y | N | SAT + impurity |
| 43 | 0.5 | 0.49 | 0.2 | 0 | 0 | DiQ-C5 | 0.23 | 0.23 | 40 | 190 | 72 | Y | N | SAT |
| 44 | 0.45 | 0.5 | 0 | 0.03 | 0 | DiDABCO-C4 | 0.4 | 0.4 | 75 | 190 | 96 | Y | N | CoAPO-SAT |
| 45 | 0.45 | 0.5 | 0 | 0.05 | 0 | DiDABCO-C4 | 0.4 | 0.4 | 75 | 190 | 96 | Y | N | CoAPO-SAT |
| 46 | 0.5 | 0.5 | 0.08 | 0 | 0 | DiDABCO-C4 | 0.33 | 0.33 | 75 | 190 | 120 | Y | Y | SAT + AFX (vs) |
| 47 | 0.5 | 0.475 | 0.1 | 0 | 0 | DiDABCO-C4 | 0.33 | 0.33 | 75 | 190 | 120 | Y | Y | SAT |
| 48 | 0.5 | 0.5 | 0.1 | 0 | 0 | DiDABCO-C4 | 0.33 | 0.33 | 75 | 190 | 120 | Y | Y | SAT |
| 49 | 0.5 | 0.45 | 0.1 | 0 | 0 | DiDABCO-C4 | 0.2 | 0.2 | 40 | 190 | 48 | Y | Y | SAT |
| 50 | 0.48 | 0.45 | 0.1 | 0 | 0 | DiDABCO-C4 | 0.2 | 0.2 | 40 | 190 | 48 | Y | Y | SAT |
| 51 | 0.46 | 0.45 | 0.1 | 0 | 0 | DiDABCO-C4 | 0.2 | 0.2 | 40 | 190 | 48 | Y | Y | SAT |
| 52 | 0.45 | 0.44 | 0.1 | 0 | 0 | DiDABCO-C4 | 0.2 | 0.2 | 40 | 190 | 48 | Y | Y | SAT |
| 53 | 0.44 | 0.45 | 0.1 | 0 | 0 | DiDABCO-C4 | 0.2 | 0.2 | 40 | 190 | 48 | Y | Y | SAT |

[a]R$_{(total)}$ refers to the total amount of OSDA placed in the gel, both in the bromide or hydroxide form. When R$_{(total)}$ = R(OH)$_2$ it indicates that the entirety of the OSDA was in the hydroxide form. When they are not, the difference between them is what was added in the R(Br)$_2$ form.
[b]'N' indicates No whereas 'Y' indicates Yes.
[c]'vs' indicates very small.

Example 54: CIT-17 in the Methanol-To-Olefins Reaction

Figure 17:
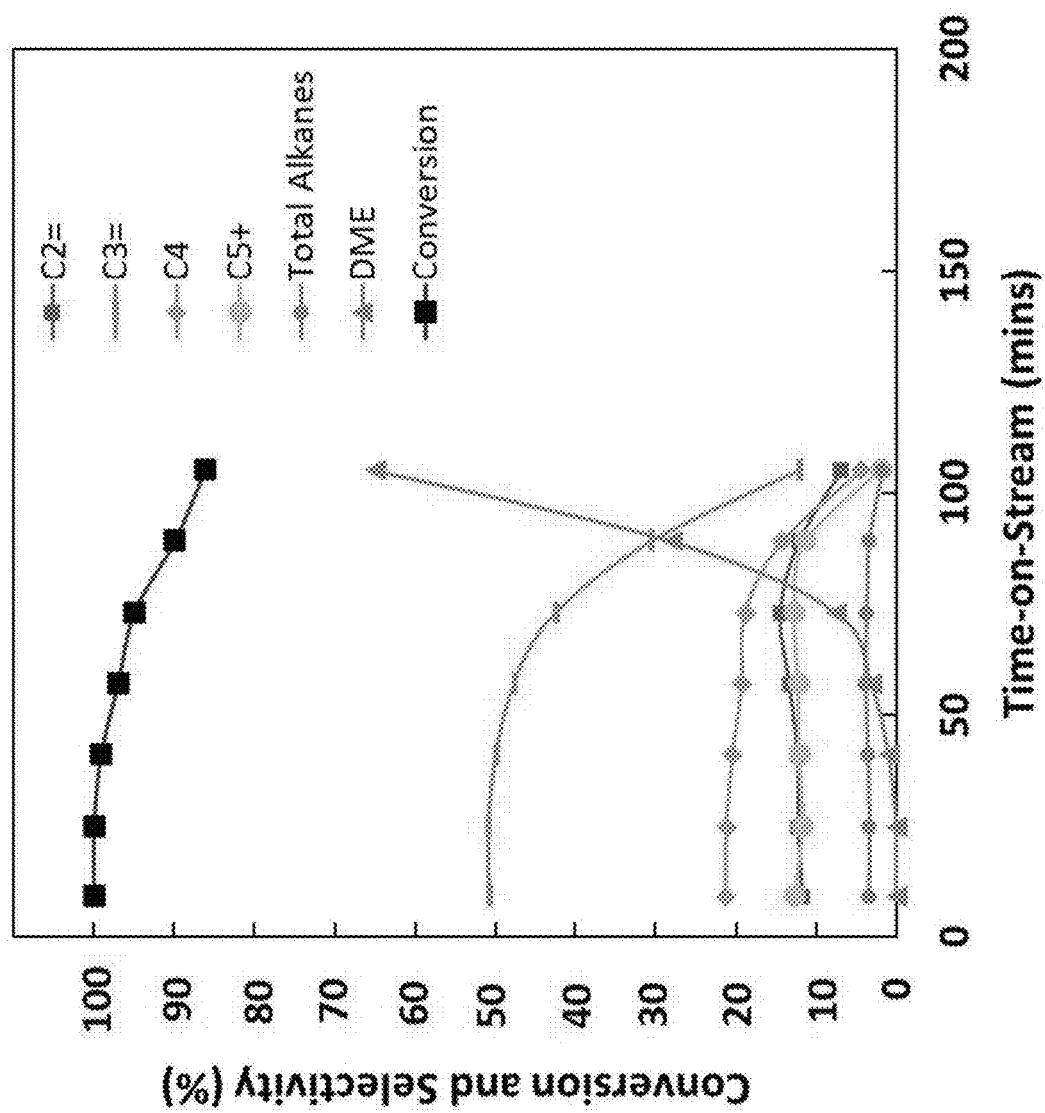
FIG. 17 shows MTO reaction data obtained at 350° C. and WHSV of 0.65 hr$^{-1}$ of CIT-17 (Example 6).
Figure 18:
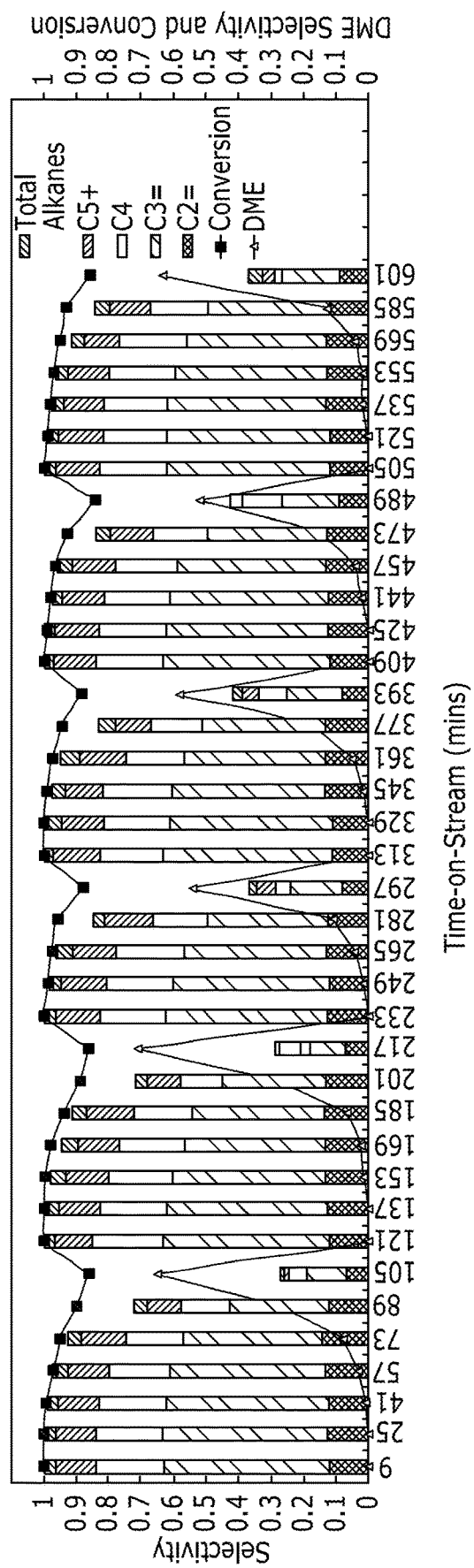
FIG. 18 shows cyclic reaction-reactivation data obtained at 350° C. and WHSV of 0.65 hr$^{-1}$ of CIT-17 (Example 6).

The thermally treated CIT-17 sample from Example 6 was tested as a catalyst in the methanol-to-olefins (MTO) reaction. Catalyst evaluation was carried out in a fixed-bed reactor at ambient pressure. Approximately 200 mg of dried CIT-17 catalyst (35-60 mesh size) was loaded between two layers of quartz wool in a 0.25"×6" stainless steel tube reactor as a part of a BTRS Jr. continuous flow reactor (Parker Autoclave Engineers). The dry weight of the catalyst was estimated on the basis of thermogravimetric analysis (TGA). All catalysts were first pretreated in-situ by heating to 150° C. at 1° C./min, held for 3 h, and then heated further to 580° C. at 1° C./min and held for 12 h under flowing air (breathing-grade D, AirGas). Methanol was introduced via a liquid syringe pump (Harvard Apparatus Pump 11 Elite) at 4.0-5.0 µL/min into a gas stream of an inert blend (95% He and 5% Ar; GC internal standard) at a volumetric flow rate of 30 cm$^3$/min. The methanol flow rate was adjusted, depending on the actual weight of the dried catalyst loaded in the reactor, to achieve a weight hourly space velocity (WHSV) of 0.65 h$^{-1}$. The reaction was performed at a WHSV of 0.65 h$^{-1}$ and a temperature of 350° C. Effluent gases were evaluated using an on-stream Agilent GC-MS (GC 6890 N/MSD5793N) equipped with a Plot-Q capillary column. Aliquots of product flow were analyzed every 16 min. All selectivity values were calculated on carbon-number basis. See FIG. 17. The amount of coke deposited (6.3%) on this catalyst following deactivation was determined via TGA analysis by heating the coked sample up to 800° C. under air. The coke content was determined from the weight loss between 300 and 800° C.

Examples 56-67: Averaged Selectivities of Various SAT-Type Molecular Sieves in MTO Several more catalysts from Examples 11, 30, 36, 38, and 44 were tested in MTO. Their averaged selectivities when methanol conversion is greater than 97+% is shown in Table 2. The results demonstrate that lower temperatures and lower WHSVs lead to higher propylene-to-ethylene ratios in SAT-type materials, although at the expense of higher $C_4$+. An averaged propylene-to-ethylene of approximately 4.2 was achieved.

What is claimed:

1. A silicoaluminophosphate-based molecular sieve having an SAT framework structure (SAPO-SAT), wherein the SAPO-SAT is substantially free of a non-SAPO-SAT phase.
2. The SAPO-SAT of claim 1, wherein the SAPO-SAT exhibits a powder X-ray diffraction (XRD) pattern exhibiting at least five of characteristic peaks at 8.4±0.2, 13.66±0.2, 16.06±0.2, 16.58±0.2, 19.62±0.2, 21.12±0.2, 21.94±0.2, 23.76±0.2, 25.6±0.2, 27.5±0.2, 29.46±0.2, and 32.02±0.2 degrees 2-θ.
3. The SAPO-SAT of claim 1, wherein the Si/T-atom ratio is from about 0.068 to about 0.094 as determined by EDS elemental analysis, wherein T=Si+Al+P.
4. The SAPO-SAT of claim 3, wherein the Si/T-atom ratio is 0.083 as determined by EDS elemental analysis, wherein T=Si+Al+P.
5. The SAPO-SAT of claim 1, wherein the SATO-SAT has a pore volume of about 0.15 cm$^3$/g.
6. The SAPO-SAT of claim 1, wherein the SATO-SAT has an XRD substantially the same as that shown in FIG. 4.
7. A process for making the SAPO-SAT molecular sieve of claim 1, the process comprising:

TABLE 2

Reaction results of SAT-type Molecular Sieves.

| Reaction Example | Catalyst Material | from Example | Si/T (EDS) | Temperature (° C.) | WHSV (MeOH) (1/h) | C2= | C3= | C2 + C3 Alkanes | C4 | C5+ | C3=/C2= |
|---|---|---|---|---|---|---|---|---|---|---|---|
| 56 | SAPO-SAT | 38 | 0.068 | 400 | 1.30 | 0.14 | 0.48 | 0.031 | 0.17 | 0.15 | 3.40 |
| 57 | SAPO-SAT-C$_5$ | 6 | 0.083 | 400 | 1.30 | 0.16 | 0.49 | 0.037 | 0.17 | 0.13 | 3.15 |
| 58 | SAPO-SAT | 36 | 0.094 | 400 | 1.30 | 0.19 | 0.47 | 0.047 | 0.16 | 0.12 | 2.47 |
| 59 | SAPO-SAT-C$_4$ | 11 | 0.072 | 400 | 1.30 | 0.13 | 0.47 | 0.021 | 0.17 | 0.15 | 3.62 |
| 60 | SAPO-SAT | 6 | 0.083 | 450 | 0.65 | 0.28 | 0.46 | 0.031 | 0.11 | 0.08 | 1.64 |
| 61 | SAPO-SAT | 6 | 0.083 | 400 | 0.65 | 0.18 | 0.40 | 0.033 | 0.17 | 0.09 | 2.22 |
| 62 | SAPO-SAT | 6 | 0.083 | 400 | 1.95 | 0.15 | 0.47 | 0.039 | 0.17 | 0.15 | 3.13 |
| 63 | SAPO-SAT | 6 | 0.083 | 400 | 2.60 | 0.14 | 0.49 | 0.047 | 0.15 | 0.15 | 3.50 |
| 64 | SAPO-SAT | 6 | 0.083 | 350 | 1.30 | 0.12 | 0.45 | 0.050 | 0.19 | 0.18 | 3.75 |
| 55 | SAPO-SAT | 6 | 0.083 | 350 | 0.65 | 0.12 | 0.50 | 0.034 | 0.2 | 0.12 | 4.17 |
| 65 | SAPO-SAT | 6 | 0.083 | 300 | 0.65 | | | DME only | | | |
| 66 | CoAPO-SAT | 44 | 0.063 | 400 | 1.30 | 0.18 | 0.42 | 0.063 | 0.164 | 0.13 | 2.33 |
| 67 | MgAPO-SAT | 30 | 0.071 | 400 | 1.30 | 0.18 | 0.35 | 0.080 | 0.159 | 0.15 | 2.01 |

Example 55: Cyclic MTO Testing on CIT-17

The thermally treated CIT-17 sample from Example 6 was subjected to cyclic testing (reaction-reactivation). The first reaction cycle was performed similarly to the procedure outlined in Example 54. After the catalyst deactivates (either its conversion drops below 85% or DME selectivity surpasses 50%) the methanol was shut off and the catalyst was cooled to approximately 100° C. before being re-activated (air) under a similar procedure as described in Example 54. The catalyst behaves similarly following each re-activation for over 600 mins of reaction time.

a. preparing a synthesis gel by a process comprising:
  i. mixing a phosphorus source and water, and stirring the resulting mixture for 10 minutes;
  ii. adding an aluminum source, and allowing the resulting gel to homogenize for 3-4 hours;
  iii. adding a silica source to the mixture;
  iv. adding an organic structure determining agent (OSDA);
b. aging the resulting synthesis gel at room temperature for 20-24 hours;
c. heating the aged synthesis gel to about 160-200° C. for about 3 days;

d. washing the resulting powder with distilled water and acetone;
e. drying the powder in a convection oven at about 80° C.

8. The process of claim 7, the process comprising:
a. preparing a synthesis gel by a process comprising:
  i. mixing phosphoric acid ($H_3PO_4$) (85%) and water, and stirring the resulting mixture for 10 minutes;
  ii. adding aluminum hydroxide, and allowing the resulting gel to homogenize for 3-4 hours;
  iii. adding fumed silica to the mixture;
  iv. adding an organic structure determining agent (OSDA);
b. aging the resulting synthesis gel at room temperature for 20-24 hours;
c. heating the aged synthesis gel to about 160-200° C. for about 3 days;
d. washing the resulting powder with distilled water and acetone;
e. drying the powder in a convection oven at about 80° C.

9. The process of claim 7, further comprising thermally treating the powder that is the product of step e. under flowing air in a furnace by:
a. heating to about 150° C. and holding for about 3 h; and then
b. heating to about 580° C. and holding for about 12 h, or until complete combustion of any remaining OSDA has been accomplished.

10. The process of claim 7, wherein the OSDA is DiQ-$C_4$, DiQ-$C_5$, or DiDABCO-$C_4$.

11. The process of claim 7, wherein the synthesis gel has a molar composition of:
0.06-0.15 $SiO_2$;
0.44-0.5 $Al_2O_3$;
0.44-0.5 $P_2O_5$;
0.17-0.33 R(OH)$_2$ wherein R is DiQ-$C_4$, DiQ-$C_5$, or DiDABCO-$C_4$; and
40-75 $H_2O$.

12. The process of claim 7, wherein the synthesis gel has a molar composition of:
0.1 $SiO_2$;
0.44-0.5 $Al_2O_3$;
0.44-0.5 $P_2O_5$;
0.2-0.33 R(OH)$_2$ wherein R=DiDABCO-$C_4$; and
40-75 $H_2O$.

13. The process of claim 7, wherein the synthesis gel has a molar composition of:
0.06-0.1 $SiO_2$;
0.5 $Al_2O_3$;
0.45-0.5 $P_2O_5$;
0.17-0.33 R(OH)$_2$ wherein R=DiQ-$C_4$; and
40-75 $H_2O$.

14. The process of claim 7, wherein the synthesis gel has a molar composition of:
0.06-0.15 $SiO_2$;
0.5 $Al_2O_3$;
0.45-0.49 $P_2O_5$;
0.23-0.27 R(OH)$_2$ wherein R=DiQ-$C_5$; and
40 $H_2O$.

15. A process for the production of propylene from a methanol-containing feed, the process comprising: passing the methanol-containing feed to a reactor, wherein the reactor comprises a catalyst comprising a SAPO-SAT molecular sieve, wherein the SAPO-SAT molecular sieve is substantially free of a non-SAPO-SAT phase, and wherein the reactor is operated at reaction conditions sufficient to generate an effluent stream comprising propylene and having a propylene to ethylene ratio between about 1.6 and about 4.2.

16. A process for the production of propylene from a methanol-containing feed, the process comprising: passing the methanol-containing feed to a reactor, wherein the reactor comprises a catalyst comprising a MeAPO-SAT molecular sieve, wherein the MeAPO-SAT molecular sieve is substantially free of a non-MeAPO-SAT phase, wherein Me is cobalt or magnesium, and wherein the reactor is operated at reaction conditions sufficient to generate an effluent stream comprising propylene and having a propylene to ethylene ratio between about 1.6 and about 4.2.

17. The process of claim 15, wherein the reactor is a fluidized bed, fixed bed, or swing fixed bed reactor.

18. The process of claim 15, wherein the process is operated at ambient pressure.

19. The process of claim 15, wherein the methanol-containing feed flow rate provides a weight hourly space velocity (WHSV) of about 0.65 h$^{-1}$ to about 2.61 h$^{-1}$.

20. The process of claim 15, wherein the reactor is operated at a temperature of about 350° C.-about 600° C.

21. The process of claim 15, wherein greater than 97% of the methanol in the methanol-containing feed is converted.

* * * * *